(12) United States Patent
Sigalov et al.

(10) Patent No.: US 8,922,969 B2
(45) Date of Patent: Dec. 30, 2014

(54) FERRITE-INDUCED SPATIAL MODIFICATION OF EM FIELD PATTERNS

(75) Inventors: Michael Sigalov, Beer-Sheva (IL); Alexander Bilchinsky, Monosson-Yahud (IL); Eran Ben Shmuel, Savyon (IL)

(73) Assignee: Goji Limited, Hamilton (BM)

( * ) Notice: Subject to any disclaimer, the term of this patent is extended or adjusted under 35 U.S.C. 154(b) by 517 days.

(21) Appl. No.: 12/926,664

(22) Filed: Dec. 2, 2010
(Under 37 CFR 1.47)

(65) Prior Publication Data

US 2014/0063676 A1  Mar. 6, 2014

Related U.S. Application Data

(60) Provisional application No. 61/266,340, filed on Dec. 3, 2009.

(51) Int. Cl.
*H05B 6/10* (2006.01)
*H05B 6/40* (2006.01)
*H05B 6/70* (2006.01)

(52) U.S. Cl.
USPC ........... 361/143; 361/146; 219/745; 219/749; 219/747

(58) Field of Classification Search
USPC .................. 361/143, 146; 219/745, 749, 747
See application file for complete search history.

(56) References Cited

U.S. PATENT DOCUMENTS

| | | | |
|---|---|---|---|
| 3,205,501 A * | 9/1965 | Kuhn | 343/778 |
| 3,210,513 A * | 10/1965 | Lenart | 219/750 |
| 3,373,259 A * | 3/1968 | Smith | 219/746 |
| 3,521,019 A | 7/1970 | White | |
| 4,173,716 A * | 11/1979 | Takahashi | 219/746 |
| 4,324,968 A | 4/1982 | Smith | |
| 4,458,126 A | 7/1984 | Dills et al. | |
| 5,008,506 A | 4/1991 | Asmussen et al. | |
| 5,632,921 A * | 5/1997 | Risman et al. | 219/750 |
| 6,614,010 B2 * | 9/2003 | Fagrell et al. | 219/690 |
| 8,334,488 B2 * | 12/2012 | Uchiyama | 219/730 |
| 2010/0176121 A1 * | 7/2010 | Nobue et al. | 219/716 |

FOREIGN PATENT DOCUMENTS

WO    WO99/17588    4/1999

OTHER PUBLICATIONS

M. Sigalov, R. Shavit and E.O. Kamenetskii, Dual Band Circular Polarized Path Antenna Using Small Ferrite Disks, IEEE 25th Convention of Electrical and Electronics Engineers in Israel, 2008; Issue Date: Dec. 3-5, 2008, pp. 523-527. Program, Progress in Electromagnetics Research Symposium, Cambridge, MA USA; Date: Jul. 5-8, 2010.

* cited by examiner

*Primary Examiner* — Zeev V Kitov
(74) *Attorney, Agent, or Firm* — Smith Risley Tempel Santos LLC; Gregory Scott Smith

(57) ABSTRACT

An apparatus for exciting a rotating field pattern in a cavity containing an object, the apparatus comprising a radiating element configured to excite an electromagnetic (EM) field pattern in the cavity, wherein the EM field pattern is excited with EM energy at a frequency in the radio-frequency (RF) range, a field rotating element configured to rotate the EM field pattern, wherein the field rotating element has an anisotropy, the anisotropy selected from magnetic anisotropy, electric anisotropy, and a combination of magnetic and electric anisotropies, and a controller configured to determine the EM field pattern according to value indicative of energy absorbable by the object and to control the anisotropy of the field rotating element in order to rotate the EM field pattern.

20 Claims, 16 Drawing Sheets
(5 of 16 Drawing Sheet(s) Filed in Color)

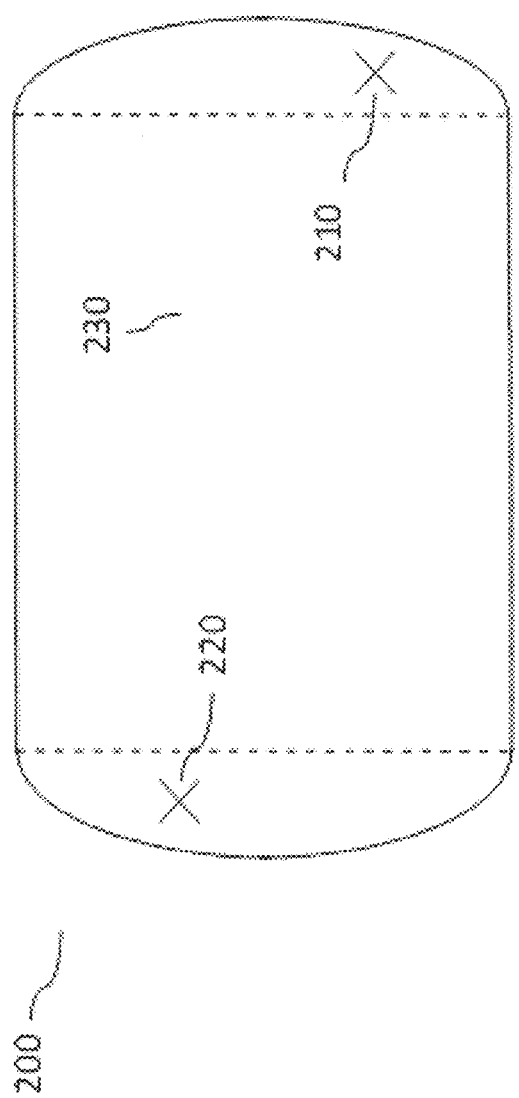

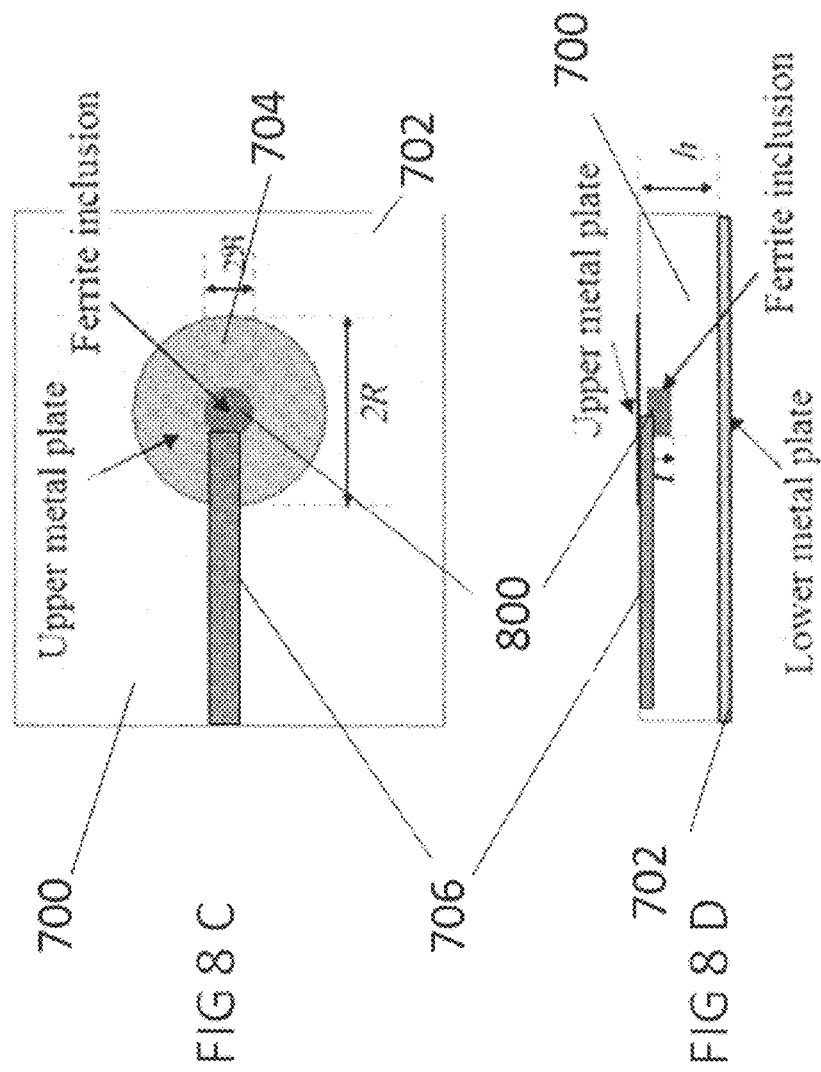

FERRITE-INDUCED SPATIAL MODIFICATION OF EM FIELD PATTERNS

RELATED APPLICATIONS

This application is based upon and claims the benefit of priority from U.S. Provisional Patent Application No. 61/266,340, filed Dec. 3, 2009.

COLOR DRAWINGS

The patent or application file contains at least one drawing executed in color. Copies of this patent or patent application publication with color drawing(s) will be provided by the Office upon request and payment of the necessary fee.

TECHNICAL FIELD

This is a U.S. Patent Application relating to a device and method for applying electromagnetic energy, and more particularly but not exclusively for a device and a method for applying electromagnetic energy in an energy application zone that contains a field rotating element.

BACKGROUND

Electromagnetic waves have been used in various applications to supply energy to objects. In the case of radio frequency (RF) radiation for example, electromagnetic energy may be supplied using a magnetron, which is typically tuned to a single frequency for supplying electromagnetic energy only in that frequency. One example of a commonly used device for supplying electromagnetic energy is a microwave oven. Typical microwave ovens supply electromagnetic energy at or about a single frequency of 2.45 GHz.

Applying EM energy to an energy application zone, e.g. a microwave cavity, at a resonant frequency, such as a resonant frequency of a microwave cavity, may result in excitation of a standing wave having local maxima and minima at a constant position in the cavity. Such a standing wave may result in a non-homogeneous energy distribution in the cavity.

SUMMARY OF EXEMPLARY ASPECTS OF THE DISCLOSURE

Some exemplary aspects of the disclosure include apparatuses and methods for applying electromagnetic energy to an object in an energy application zone. More particularly, but not exclusively, exemplary aspects include applying electromagnetic (EM) energy to an energy application zone comprising at least one field rotating element configured to rotate electromagnetic field patterns excited in the energy application zone. Rotating the EM field patterns may result in more uniform energy distributions in the energy application zone over time, and may also result in more uniform energy distributions in the object. Rotating the EM field pattern may allow field intensity maxima to move continuously, such as in a continuous rotational manner, such that energy may distribute more evenly and/or across larger portions of the energy application zone than if the EM field pattern were not rotated. This may also result in transferring or delivering energy to the object more uniformly and, thus, may result in more uniform energy dissipation in the object.

Some exemplary aspects of the invention may be directed to an apparatus for exciting a rotating electromagnetic (EM) field pattern in a cavity including an object. The apparatus may include at least one radiating element configured to excite an EM field pattern in the cavity, wherein EM radiation creating the EM field pattern is at a frequency in the radio frequency (RF) band, at least one field rotating element and at least one controller configured to determine the EM field pattern according to a value indicative of energy absorbable by the object, wherein the field rotating element has an anisotropy, selected from magnetic anisotropy, electric anisotropy, and a combination of magnetic and electric anisotropies, and the controller is configured to control the anisotropy of the field rotating element according to the EM field pattern. Optionally, the apparatus may include at least two radiating elements configured to excite at least one EM field pattern in the cavity and the controller may be further configured to control phase difference between EM radiation emitted by the at least two of the radiating elements.

In some embodiments, the field rotating element may comprise magnetizable material, and the apparatus may include a magnetic source for causing magnetic anisotropy in the magnetizable material.

The apparatus may further include a controller configured to control the magnetic anisotropy in the magnetizable material by controlling the magnetic source. This controller may be the same as or different from the controller configured to determine the EM field pattern.

Some exemplary aspects of the invention may refer to an apparatus for applying electromagnetic energy to an energy application zone. The apparatus may include: at least one radiating element configured to transfer, deliver, supply or apply EM energy to the energy application zone, at least one controller configured to determine at least one modulation space element (MSE) that excites at least one EM field pattern in the energy application zone, and at least one field rotating element configured such that, when the radiating element transfers electromagnetic energy in the determined MSE, the excited field pattern rotates.

The field rotating element may have anisotropy selected from magnetic anisotropy, electric anisotropy, and a combination of magnetic and electric anisotropies. A field rotating element having a magnetic anisotropy may comprise a magnetizable material element, for example ferrite, and the apparatus may include a magnetic source, wherein the magnetic source may cause magnetic anisotropy in the magnetizable material element. The controller may be configured to control the magnetic anisotropy in the field rotating element by controlling the magnetic source. Controlling the magnetic source may be in accordance with the determined MSE. Alternatively or additionally, the controller may be configured to control one or more of direction, strength, duration, and timing of a magnetic field applied by the magnetic source.

The energy application zone may comprise a cavity, frame or other structure or construction capable of holding and/or contain an object to be processed by electromagnetic energy (e.g., a resonator cavity).

In some embodiments, two or more radiating elements may be used to excite at least one MSE. Optionally, a plurality of MSEs may be used to transfer, deliver, supply or apply energy to the energy application zone and to excite a plurality of field patterns. Optionally, the plurality of field patterns is excited sequentially.

Some embodiments may relate to a method for applying electromagnetic energy to an energy application zone containing at least one field rotating element. The method may include: determining at least one modulation space element (MSE) that excites at least one field pattern in the energy application zone, causing anisotropy in the field rotating element according to the at least one MSE, and transferring electromagnetic energy to the energy application zone at the at least one MSE. Causing anisotropy in the field rotating element may include magnetizing a magnetizable material included and/or embedded in the field rotating element, optionally by forming a magnetic field near the magnetizable material. Forming the magnetic field may be in accordance with the MSE. Sequential transfer of a plurality of EM field patterns may be accompanied with alteration of the magnetization of the magnetizable material such that, for example, at the magnetic field corresponds to the EM field pattern excited in the energy application zone. Magnetizing the magnetizable material may be accomplished by, for example, controlling one or more of the direction, strength, duration, and timing of the magnetic field.

The drawings and detailed description which follow contain numerous alternative examples consistent with the invention. A summary of every feature disclosed is beyond the object of this summary section. For a more detailed description of exemplary aspects of the invention, reference should be made to the drawings, detailed description, and claims, which are incorporated into this summary by reference.

BRIEF DESCRIPTION OF THE DRAWINGS

FIG. 2B is a view of a cavity, in accordance with some exemplary embodiments of the present invention;

FIGS. 8C-8D represent top and side views of an energy application zone comprising a field rotating element in accordance with some exemplary embodiments of the present invention;

DETAILED DESCRIPTION

Reference will now be made in detail to exemplary embodiments of the invention, examples of which are illustrated in the accompanying drawings. When appropriate, the same reference numbers are used throughout the drawings to refer to the same or like parts.

In one respect, the invention may involve apparatus and methods for applying electromagnetic energy. The term electromagnetic energy, as used herein, includes any or all portions of the electromagnetic spectrum, including but not limited to, radio frequency (RF), infrared (IR), near infrared, visible light, ultraviolet, etc. In one particular example, applied electromagnetic energy may include RF energy with a wavelength in free space of 100 km to 1 mm, which corresponds to a frequency of 3 KHz to 300 GHz, respectively. In some other examples, the applied electromagnetic energy may fall within frequency bands between 500 MHz to 1500 MHz or between 700 MHz to 1200 MHz or between 800 MHz-1 GHz. Microwave and ultra high frequency (UHF) energy, for example, are both within the RF range. Even though examples of the invention are described herein in connection with the application of RF energy, these descriptions are provided to illustrate a few exemplary principles of the invention, and are not intended to limit the invention to any particular portion of the electromagnetic spectrum.

For exemplary purposes, this disclosure contains a number of examples of electromagnetic energy used for heating. These descriptions are provided to illustrate exemplary principles of the invention. The invention, as described and claimed, may provide benefit for various industrial, commercial, and consumer processes involving the application of energy, regardless of whether the application of energy results in heating.

Figure 1:
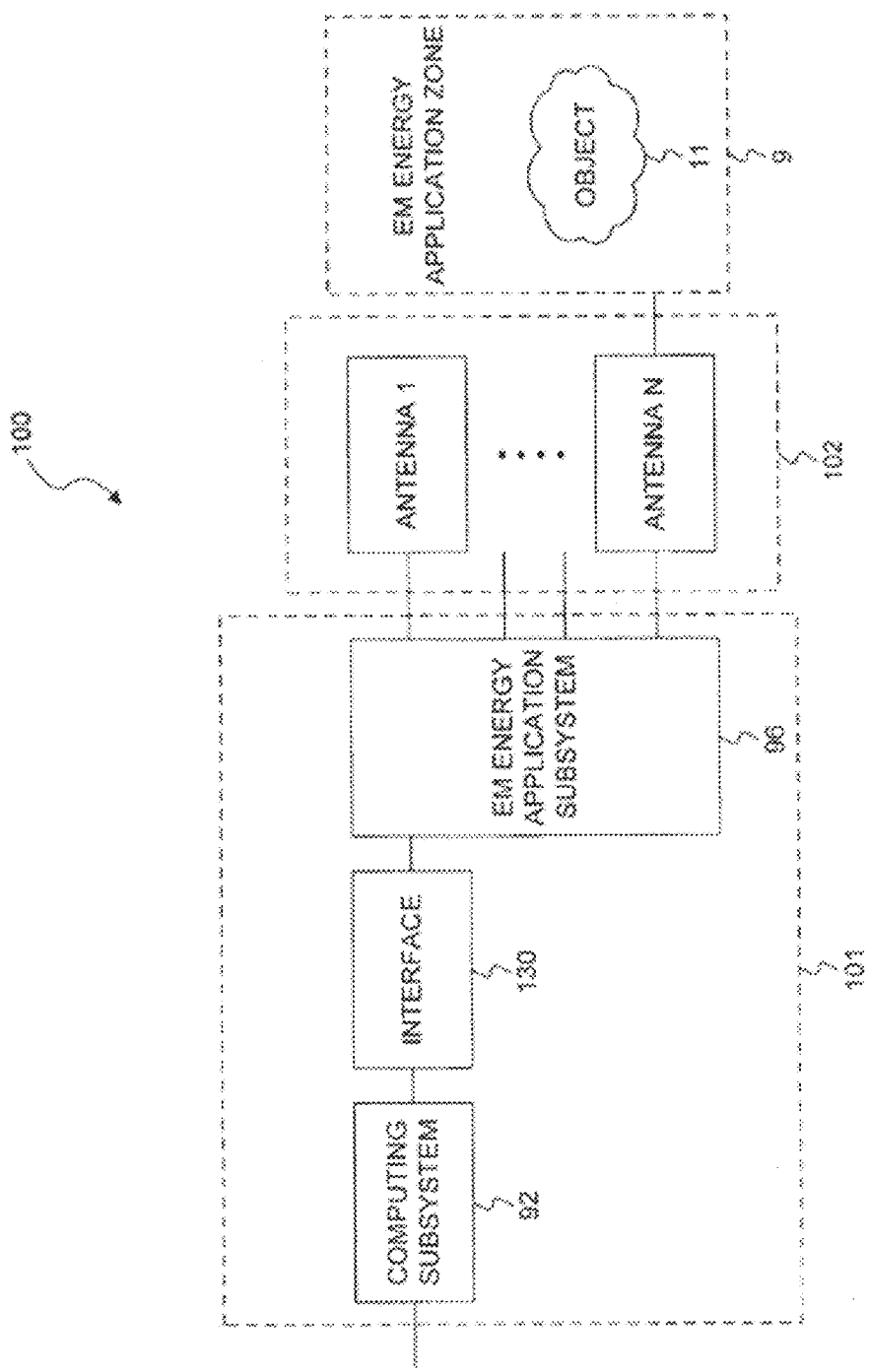
FIG. 1 is a diagrammatic representation of an apparatus for applying electromagnetic energy to an object, in accordance with some exemplary embodiments of the present invention.

In certain embodiments, the application of electromagnetic energy may occur in an "energy application zone", such as energy application zone 9, as shown in FIG. 1. Energy application zone 9 may include any void, location, region, or area where electromagnetic energy may be applied. It may be hollow, or may be filled or partially filled with liquids, solids, gases, or combinations thereof. By way of example only, energy application zone 9 may include an interior of an enclosure, interior of a partial enclosure, open space, solid, or partial solid, which allows existence, propagation, and/or resonance of electromagnetic waves. Zone 9 may include a conveyor belt or a rotating plate. For purposes of this disclosure, all such energy application zones may alternatively be referred to as cavities. It is to be understood that an object is considered "in" the energy application zone if at least a portion of the object is located in the zone or if some portion of the object receives delivered electromagnetic radiation.

In accordance with some embodiments of the invention, an apparatus or method may involve the use of at least one source configured to deliver electromagnetic energy to the energy application zone. A "source" may include any component(s) that are suitable for generating and delivering electromagnetic energy. Consistent with some embodiments of the invention, electromagnetic energy may be delivered to the energy application zone in the form of propagating electromagnetic waves at predetermined wavelengths or frequencies (also known as electromagnetic radiation). As used consistently herein, "propagating electromagnetic waves" may include resonating waves, evanescent waves, and waves that travel through a medium in any other manner. Electromagnetic radiation carries energy that may be imparted to (or dissipated into) matter with which it interacts.

In certain embodiments, electromagnetic energy may be applied to an object 11. References to an "object" (or "object to be heated") to which electromagnetic energy is applied is not limited to a particular form. An object may include a liquid, semi-liquid, solid, semi-solid, or gas, depending upon the particular process with which the invention is utilized. The object may also include composites or mixtures of matter in differing phases. Thus, by way of non-limiting example, the term "object" encompasses such matter as food to be defrosted or cooked; clothes or other wet material to be dried; frozen organs to be thawed; chemicals to be reacted; fuel or other combustible material to be combusted; hydrated material to be dehydrated, gases to be expanded; liquids to be heated, boiled or vaporized, or any other material for which there is a desire to apply, even nominally, electromagnetic energy. The object may be a large and/or thick object, for example the object may have a minimal cross section larger than few centimeters, e.g., 1, 3, 5 cm across at least 50% of its weight.

In some embodiments, object 11 may constitute at least a portion of a load. For example, a portion of electromagnetic energy supplied to energy application zone 9 may be absorbed by object 11. In some embodiments, another portion of the electromagnetic energy supplied or delivered to energy application zone 9 may be absorbed by various elements (e.g., food residue, particle residue, additional objects, structures associated with zone 9, or any other electromagnetic energy-absorbing materials found in zone 9) associated with energy application zone 9. Energy application zone 9 may also include loss constituents that do not, themselves, absorb an appreciable amount of electromagnetic energy, but otherwise account for electromagnetic energy losses. Such loss constitutes may include, for example, cracks, seams, joints, doors, or any other loss mechanisms associated with energy application zone 9. Thus, in some embodiments, a load may include at least a portion of object 11 along with any electromagnetic energy-absorbing constituents in the energy application zone as well as any electromagnetic energy loss constituents associated with the zone.

FIG. 1 is a diagrammatic representation of an apparatus 100 for applying electromagnetic energy to an object. Apparatus 100 may include a controller 101, an array of antennas 102 including one or more antennas, and energy application zone 9. Controller 101 may be electrically coupled to one or more antennas 102. As used herein, the term "electrically coupled" refers to one or more either direct or indirect electrical connections. Controller 101 may include a computing subsystem 92, an interface 130, and an electromagnetic energy application subsystem 96. Based on an output of computing subsystem 92, energy application subsystem 96 may respond by generating one or more radio frequency signals to be supplied to antennas 102. In turn, the one or more antennas 102 may radiate electromagnetic energy into energy application zone 9. In certain embodiments, this energy can interact with object 11 positioned within energy application zone 9.

Consistent with the presently disclosed embodiments, computing subsystem 92 may include a general purpose or special purpose computer. Computing subsystem 92 may be configured to generate control signals for controlling electromagnetic energy application subsystem 96 via interface 130. Computing subsystem 92 may further receive measured signals from electromagnetic energy application subsystem 96 via interface 130.

While controller 101 is illustrated for exemplary purposes as having three subcomponents, control functions may be consolidated in fewer components, or additional components may be included consistent with the desired function and/or design of a particular embodiment.

Exemplary energy application zone 9 may include locations where energy is applied in an oven, chamber, tank, dryer, thawer, dehydrator, reactor, engine, chemical or biological processing apparatus, furnace, incinerator, material shaping or forming apparatus, conveyor, combustion zone, cooler, freezer, etc. Thus, consistent with the presently disclosed embodiments, energy application zone 9 may include an electromagnetic resonator 10 (also known as cavity resonator, or cavity) (illustrated for example in FIG. 2A). At times, energy application zone 9 may be congruent with the object or a portion of the object (e.g., the object or a portion thereof, is or may define the energy application zone).

Figure 2A:
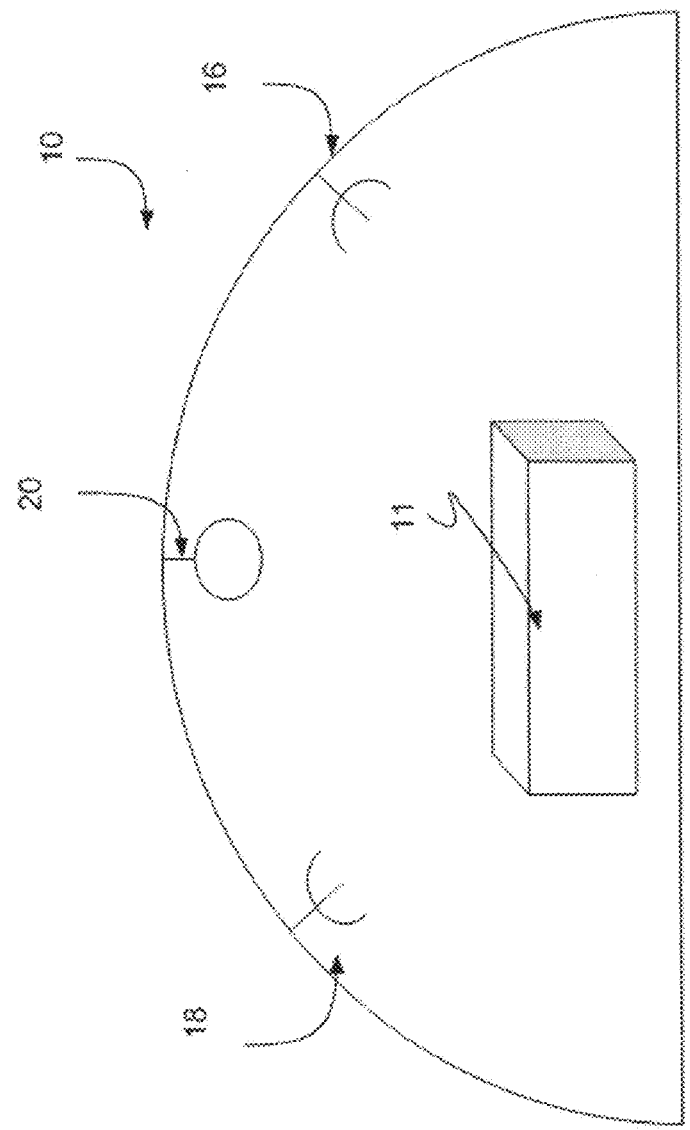
FIG. 2A is a view of a cavity, in accordance with some exemplary embodiments of the present invention.

FIG. 2A shows a sectional view of a cavity 10, which is one exemplary embodiment of energy application zone 9. Cavity 10 may be cylindrical in shape (or any other suitable shape, such as semi-cylindrical, rectangular, elliptical, cuboid, symmetrical, asymmetrical, irregular, or regular, among others) and may be made of a conductor, such as aluminum, stainless steel or any suitable metal or other conductive material. In some embodiments, cavity 10 may include walls coated and/or covered with a protective coating, for example, made from materials transparent to EM energy, e.g., metallic oxides or others. In some embodiments, cavity 10 may have a spherical shape or hemispherical shape (for example as illustrated in FIG. 2A). Cavity 10 may be resonant in a predetermined range of frequencies (e.g., within the UHF or microwave range of frequencies, such as between 300 MHz and 3 GHz, or between 400 MHz and 1 GHZ). It is also contemplated that cavity 10 may be closed, e.g., completely enclosed (e.g., by conductor materials), bounded at least partially, or open, e.g., having non-bounded openings. The general methodology of the invention is not limited to any particular cavity shape or configuration, as discussed earlier. FIG. 2A shows a sensor 20 and antennas 16 and 18 (examples of antennas 102 shown in FIG. 1).

FIG. 2B shows a top sectional view of a cavity 200 according to another exemplary embodiment of energy application zone 9. FIG. 2B shows antennas 210 and 220 (as examples of antennas 102 shown in FIG. 1). Cavity 200 comprises a space 230 for receiving object 11 (not shown). Space 230, as shown between the dotted lines in FIG. 2B, has an essentially rectangular cross section, which may be adapted for receiving a tray on top of which object 11 may be placed.

In some embodiments, field adjusting element(s) (not illustrated) may be provided in energy application zone 9, for example, in cavity 10 and/or cavity 200. Field adjusting element(s) may be adjusted to change the electromagnetic wave pattern in the cavity in a way that selectively directs the electromagnetic energy from one or more of antennas 16 and 18 (or 210 and 220) into object 11. Additionally or alternatively, field adjusting element(s) may be further adjusted to simultaneously match at least one of the antennas that act as transmitters, and thus reduce coupling to the other antennas that act as receivers. Exemplary field adjusting element(s) are described in U.S. patent application Ser. No. 12/906,604 entitled "Food Preparation", and U.S. Provisional Patent Application No. 61/322,133 entitled "System and Method for Applying Electromagnetic Energy", which are fully incorporated herein by reference.

Additionally, one or more sensor(s) (or detector(s)) 20 may be used to sense (or detect) information (e.g., signals) relating to object 11 and/or to the energy application process and/or the energy application zone. At times, one or more antennas, e.g., antenna 16, 18, 210 or 220, may be used as sensors. The sensors may be used to sense any information, including electromagnetic power, temperature, weight, humidity, motion, etc. The sensed information may be used for any purpose, including process verification, automation, authentication, safety, etc.

In the presently disclosed embodiments, more than one feed and/or a plurality of radiating elements (e.g., antennas) may be provided. The radiating elements may be located on one or more surfaces of, e.g., an enclosure defining the energy application zone. Alternatively, radiating elements may be located inside or outside the energy application zone. One or more of the radiating elements may be near to, in contact with, in the vicinity of or even embedded in object 11 (e.g., when the object is a liquid). The orientation and/or configuration of each radiating element may be distinct or the same, based on the specific energy application, e.g., based on a desired target effect. Each radiating element may be positioned, adjusted, and/or oriented to transmit electromagnetic waves along a same direction, or various different directions. Furthermore, the location, orientation, and configuration of each radiating element may be predetermined before applying energy to the object. Alternatively or additionally, the location, orientation, and configuration of each radiating element may be dynamically adjusted, for example, by using a processor, during operation of the apparatus and/or between rounds of energy application. The invention is not limited to radiating elements having particular structures or locations within the apparatus.

As represented by the block diagram of FIG. 1, apparatus 100 may include at least one radiating element in the form of at least one antenna 102 for delivery of electromagnetic energy to energy application zone 9. One or more of the antenna(s) may also be configured to receive electromagnetic energy from energy application zone 9. In other words, an antenna, as used herein may function as a transmitter, a receiver, or both, depending on a particular application and configuration. When an antenna acts as a receiver of electromagnetic energy from an energy application zone (e.g., reflected electromagnetic waves), the antenna receives electromagnetic energy from the energy application zone.

As used herein, the terms "radiating element" and "antenna" may broadly refer to any structure from which electromagnetic energy may radiate and/or be received, regardless of whether the structure was originally designed for the purposes of radiating or receiving energy, and regardless of whether the structure serves any additional function. For example, a radiating element or an antenna may include an aperture/slot antenna, or an antenna which includes a plurality of terminals transmitting in unison, either at the same time or at a controlled dynamic phase difference (e.g., a phased array antenna). Consistent with some exemplary embodiments, antennas 102 may include an electromagnetic energy transmitter (referred to herein as "a transmitting antenna") that feeds energy into electromagnetic energy application zone 9, an electromagnetic energy receiver (referred herein as "a receiving antenna") that receives energy from zone 9, or a combination of both a transmitter and a receiver. For example, a first antenna may be configured to supply electromagnetic energy to zone 9, and a second antenna may be configured to receive energy from the first antenna. In some embodiments, one or more antennas may each serve as both receivers and transmitters. In some embodiments, one or more antennas may serve a dual function while one or more other antennas may serve a single function. So, for example, a single antenna may be configured to both deliver electromagnetic energy to the zone 9 and to receive electromagnetic energy via the zone 9; a first antenna may be configured to deliver electromagnetic energy to the zone 9, and a second antenna may be configured to receive electromagnetic energy via the zone 9; or a plurality of antennas could be used, where at least one of the plurality of antennas may be configured to both deliver electromagnetic energy to zone 9 and to receive electromagnetic energy via zone 9. At times, in addition to or as an alternative to delivering and/or receiving energy, an antenna may also be adjusted to affect the EM field pattern. For example, various properties of the antenna, such as position, location, orientation, temperature, etc., may be adjusted. Different antenna property settings may result in differing electromagnetic field patterns within the energy application zone thereby affecting energy absorption in the object. Therefore, antenna adjustments may constitute one or more variables that can be varied in an energy delivery scheme.

Consistent with the presently disclosed embodiments, energy may be supplied and/or provided to one or more transmitting antennas. Energy supplied to a transmitting antenna may result in energy emitted by the transmitting antenna (referred to herein as "incident energy"). The incident energy may be delivered to zone 9, and may be in an amount equal to an amount of energy supplied to the transmitting antenna(s) by a source. A portion of the incident energy may be dissipated in the object or absorbed by the object (referred to herein as "dissipated energy" or "absorbed energy"). Another portion may be reflected back to the transmitting antenna (referred to herein as "reflected energy"). Reflected energy may include, for example, energy reflected back to the transmitting antenna due to mismatch caused by the object and/or the energy application zone, e.g., impedance mismatch. Reflected energy may also include energy retained by the port of the transmitting antenna (e.g., energy that is emitted by the antenna but does not flow into the zone). The rest of the incident energy, other than the reflected energy and dissipated energy, may be transmitted to one or more receiving antennas other than the transmitting antenna (referred to herein as "transmitted energy."). Therefore, the incident energy ("I") supplied to the transmitting antenna may include all of the dissipated energy ("D"), reflected energy ("R"), and transmitted energy ("T"), and may be expressed according to the relationship:

$$I=D+R+\Sigma T_i.$$

In accordance with certain aspects of the invention, the one or more transmitting antennas may deliver electromagnetic energy into zone 9. Energy delivered by a transmitting antenna into the zone (referred to herein as "delivered energy" or (d)) may be the incident energy emitted by the antenna minus the reflected energy at the same antenna. That is, the delivered energy may be the net energy that flows from the transmitting antenna to the zone, i.e., d=I−D. Alternatively, the delivered energy may also be represented as the sum of dissipated energy and transmitted energy, i.e., d=R+T (where T=ΣTi).

In certain embodiments, the application of electromagnetic energy may occur via one or more power feeds. A feed may include one or more waveguides and/or one or more radiating elements (e.g., antennas 102) for applying electromagnetic energy to the zone. Such antennas may include, for example, patch antennas, fractal antennas, helix antennas, log-periodic antennas, spiral antennas, slot antennas, dipole antennas, loop antennas, slow wave antennas, leaky wave antennas or any other structures capable of transmitting and/or receiving electromagnetic energy.

The invention is not limited to antennas having particular structures or locations. Antennas, e.g., antenna 102, may be polarized in differing directions in order to, for example, reduce coupling, enhance specific field pattern(s), increase the energy delivery efficiency and support and/or enable a specific algorithm(s). The foregoing are examples only, and polarization may be used for other purposes as well. In one example, three antennas may be placed parallel to orthogonal coordinates; however, it is contemplated that any suitable number of antennas (such as one, two, three, four, five, six, seven, eight, etc.) may be used. For example, a higher number of antennas may add flexibility in system design and improve control of energy distribution, e.g., greater uniformity and/or resolution of energy application in zone 9.

Antennas, e.g., antenna 102, may be configured to feed energy at specifically chosen modulation space elements, referred to herein as MSEs, which are optionally chosen by controller 101. The term "modulation space" or "MS" is used to collectively refer to all the parameters that may affect a field pattern and/or modes in the energy application zone and all combinations thereof. In some embodiments, the "MS" may include all possible components that may be used and their potential settings (absolute and/or relative to others) and adjustable parameters associated with the components. For example, the "MS" may include a plurality of variable parameters, the number of antennas, their positioning and/or orientation (if modifiable), the useable bandwidth, a set of all useable frequencies and any combinations thereof, power settings, phases, etc. The MS may have any number of possible variable parameters, ranging between one parameter only (e.g., a one dimensional MS limited to frequency only or phase only—or other single parameter), two or more dimensions (e.g., varying frequency and amplitude or varying frequency and phase together within the same MS), or many more.

Figure 3:
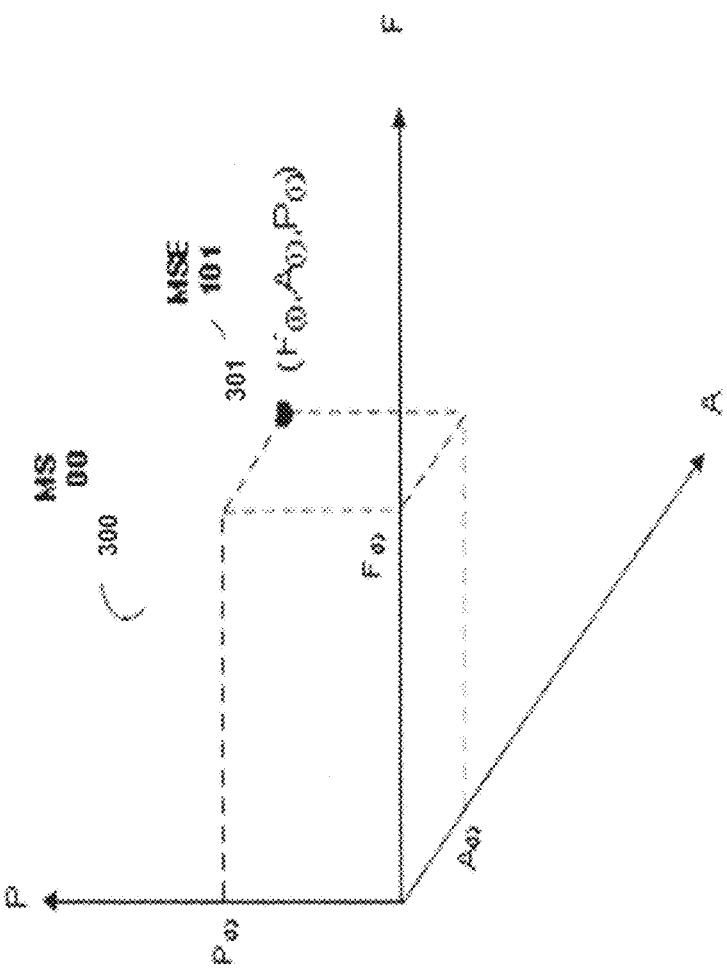
FIG. 3 is a representation of an exemplary modulation space, in accordance with some exemplary embodiments of the present invention.

Each variable parameter associated with the MS is referred to as an MS dimension. By way of example, FIG. 3 illustrates a three dimensional modulation space 300, with three dimensions designated as frequency (F), phase (P), and amplitude (A). That is, in MS 300, frequency, phase, and amplitude (e.g., an amplitude difference between two or more waves being transmitted at the same time) of the electromagnetic waves are modulated during energy delivery, while all the other parameters may be predetermined and fixed during energy delivery. In FIG. 3, the modulation space is depicted in three dimensions for ease of discussion only. The MS may have any number of dimensions, e.g., one dimension, two dimensions, four dimensions, n dimensions, etc. In one example, a one dimensional modulation space oven may provide MSEs that differ one from the other only by frequency.

The term "modulation space element" or "MSE," may refer to a specific set of values of the variable parameters in MS. Therefore, the MS may also be considered to be a collection of all possible MSEs. For example, two MSEs may differ one from another in the relative amplitudes of the energy being supplied to a plurality of radiating elements. For example, FIG. 3 shows an MSE 301 in the three-dimensional MS 300. MSE 301 has a specific frequency F(i), a specific phase P(i), and a specific amplitude A(i). If even one of these MSE variables changes, then the new set defines another MSE. For example, (3 GHz, 30°, 12 V) and (3 GHz, 60°, 12 V) are two different MSEs, although only the phase component is different.

Differing combinations of these MS parameters will lead to differing field patterns across the energy application zone and differing energy distribution patterns in the object. A plurality of MSEs that can be executed sequentially or simultaneously to excite a particular field pattern in the energy application zone may be collectively referred to as an "energy delivery scheme." For example, an energy delivery scheme may consist of three MSEs: (F(1), P(1), A(1)); (F(2), P(2), A(2)) (F(3), P(3), A(3)). Such an energy application scheme may result in applying the first, second, and third MSE to the energy application zone.

The invention, in its broadest sense, is not limited to any particular number of MSEs or MSE combinations. Various MSE combinations may be used depending on the requirements of a particular application and/or on a desired energy transfer profile, and/or given equipment, e.g., cavity dimensions. The number of options that may be employed could be as few as two or as many as the designer desires, depending on factors such as intended use, level of desired control, hardware or software resolution and cost.

In certain embodiments, there may be provided at least one processor. As used herein, the term "processor" may include an electric circuit that performs a logic operation on input or inputs. For example, such a processor may include one or more integrated circuits, microchips, microcontrollers, microprocessors, all or part of a central processing unit (CPU), graphics processing unit (GPU), digital signal processors (DSP), field-programmable gate array (FPGA) or other circuit suitable for executing instructions or performing logic operations. The at least one processor may be coincident with or may be part of controller 101.

The instructions executed by the processor may, for example, be pre-loaded into the processor or may be stored in a separate memory unit such as a RAM, a ROM, a hard disk, an optical disk, a magnetic medium, a flash memory, other permanent, fixed, or volatile memory, or any other mechanism capable of storing instructions for the processor. The processor(s) may be customized for a particular use, or can be configured for general-purpose use and can perform different functions by executing different software.

If more than one processor is employed, all may be of similar construction, or they may be of differing constructions electrically connected or disconnected from each other. They may be separate circuits or integrated in a single circuit. When more than one processor is used, they may be configured to operate independently or collaboratively. They may be coupled electrically, magnetically, optically, acoustically, mechanically or by other means permitting them to interact.

The at least one processor may be configured to cause electromagnetic energy to be applied to zone 9 via one or more antennas, for example across a series of MSEs, in order to apply electromagnetic energy at each such MSE to an object 11. For example, the at least one processor may be configured to regulate one or more components of controller 101 in order to cause the energy to be applied.

In certain embodiments, the at least one processor may be configured to determine a value indicative of energy absorbable by the object at each of a plurality of MSEs. This may occur, for example, using one or more lookup tables, by pre-programming the processor or memory associated with the processor, and/or by testing an object in an energy application zone to determine its absorbable energy characteristics. One exemplary way to conduct such a test is through a sweep.

As used herein, a sweep may include, for example, the transmission over time of energy at more than one MSE. For example, a sweep may include the sequential transmission of energy at multiple MSEs in one or more contiguous MSE band; the sequential transmission of energy at multiple MSEs in more than one non-contiguous MSE band; the sequential transmission of energy at individual non-contiguous MSEs; and/or the transmission of synthesized pulses having a desired MSE/power spectral content (e.g., a synthesized pulse in time). The MSE bands may be contiguous or non-contiguous. Thus, during an MSE sweeping process, the at least one processor may regulate the energy supplied to the at least one antenna to sequentially deliver electromagnetic energy at various MSEs to zone 9, and to receive feedback which serves as an indicator of the energy absorbable by object 11. While the invention is not limited to any particular measure of feedback indicative of energy absorption in the object, various exemplary indicative values are discussed below.

During the sweeping process, electromagnetic energy application subsystem 96 may be regulated to receive electromagnetic energy reflected and/or coupled at antenna(s) 102, and to communicate the measured energy information (e.g., information pertaining to and/or related to and/or associated with the measured energy) back to computing subsystem 92 via interface 130, as illustrated in FIG. 1. Computing subsystem 92 may then be regulated to determine a value indicative of energy absorbable by object 11 at each of a plurality of MSEs based on the received information. Consistent with some of the presently disclosed embodiments, a value indicative of the absorbable energy may include a dissipation ratio (referred to herein as "DR") associated with each of a plurality of MSEs. As referred to herein, a "dissipation ratio" (or "absorption efficiency" or "power efficiency"), may be defined as a ratio between electromagnetic energy absorbed by object 11 and electromagnetic energy supplied into electromagnetic energy application zone 9.

Energy that may be dissipated or absorbed by an object is referred to herein as "absorbable energy" or "absorbed energy". Absorbable energy may be an indicator of the object's capacity to absorb energy or the ability of the apparatus to cause energy to dissipate in a given object (for example—an indication of the upper limit thereof). In some of the presently disclosed embodiments, absorbable energy may be calculated as a product of the incident energy (e.g., maximum incident energy) supplied to the at least one antenna and the dissipation ratio. Reflected energy (e.g., the energy not absorbed or transmitted) may, for example, be a value indicative of energy absorbed by the object. By way of another example, a processor might calculate or estimate absorbable energy based on the portion of the incident energy that is reflected and the portion that is transmitted. That estimate or calculation may serve as a value indicative of absorbed and/or absorbable energy.

During an MSE sweep, for example, the at least one processor may be configured to control a source of electromagnetic energy such that energy is sequentially supplied to an object at a series of MSEs. The at least one processor might then receive a signal indicative of energy reflected at each MSE and, optionally, also a signal indicative of the energy transmitted to other antennas at each MSE. Using a known amount of incident energy supplied to the antenna and a known amount of energy reflected and/or transmitted (e.g., thereby indicating an amount of energy absorbed at each MSE), an absorbable energy indicator may be calculated or estimated. Alternatively, the processor might simply rely on an indicator of reflection and/or transmission as a value indicative of absorbable energy.

Absorbable energy may also include energy that may be dissipated by the structures of the energy application zone in which the object is located (e.g., cavity walls) or leakage of energy at an interface between an oven cavity and an oven door. Because absorption in metallic or conducting material (e.g., the cavity walls or elements within the cavity) is characterized by a large quality factor (also known as a "Q factor"), MSEs having a large Q factor may be identified as being associated with conducting material, and at times, a choice may be made not to transmit energy in such MSEs. In that case, the amount of electromagnetic energy absorbed in the cavity walls may be substantially small, and thus, the amount of electromagnetic energy absorbed in the object may be substantially equal to the amount of absorbable energy.

In some of the presently disclosed embodiments, a dissipation ratio may be calculated using formula (1):

$$DR = (P_{in} - P_{rf} - P_{cp})/P_{in} \qquad (1)$$

where $P_{in}$ represents the electromagnetic energy and/or power supplied into zone 9 by antennas 102, $P_{rf}$ represents the electromagnetic energy reflected/returned at those antennas that function as transmitters, and $P_{cp}$ represents the electromagnetic energy coupled at those antennas that function as receivers. DR may be a value between 0 and 1, and thus may be represented by a percentage number.

For example, consistent with an embodiment which is designed for three antennas 1, 2, and 3, computing subsystem 92 may be configured to determine input reflection coefficients $S_{11}$, $S_{22}$, and $S_{33}$ and the transfer coefficients may be $S_{12}=S_{21}$, $S_{13}=S_{31}$, $S_{23}=S_{32}$ based on a measured power and/or energy information during the sweep. Accordingly, the dissipation ratio DR corresponding to antenna 1 may be determined based on the above mentioned reflection and transmission coefficients, according to formula (2):

$$DR = 1 - (|S_{11}|^2 + |S_{12}|^2 + |S_{13}|^2). \qquad (2)$$

The value indicative of the absorbable energy may further involve the maximum incident energy associated with a power amplifier (not illustrated) of subsystem 96 at the given MSE. As referred herein, a "maximum incident energy" may be defined as the maximal power that may be provided to the antenna at a given MSE throughout a given period of time. Thus, one alternative value indicative of absorbable energy may be the product of the maximum incident energy and the dissipation ratio. These are just two examples of values that may be indicative of absorbable energy which could be used alone or together as part of control schemes implemented in controller 101. Alternative indicators of absorbable energy may be used, depending for example on the structure employed and the application.

In certain embodiments, the at least one processor may also be configured to cause energy to be supplied to the at least one radiating element in at least a subset of a plurality of MSEs. Energy transmitted to the zone at each of the subset of MSEs may be a function of the absorbable energy value at the corresponding MSE. For example, energy transmitted to the zone at MSE(i) may be a function of the absorbable energy value at MSE(i). The energy supplied to at least one antenna 102 at each of the subset of MSEs may be determined as a function of the absorbable energy value at each MSE (e.g., as a function of a dissipation ratio, maximum incident energy, a combination of the dissipation ratio and the maximum incident energy, or some other indicator). In some embodiments, the subset of the plurality of MSEs and/or the energy transmitted to the zone at each of the subset of MSEs may be determined based on or in accordance with a result of absorbable energy information (e.g., absorbable energy feedback) obtained during an MSE sweep (e.g., at the plurality of MSEs). That is, using the absorbable energy information, the at least one processor may adjust energy supplied at each MSE such that the energy at a particular MSE may in some way be a function of an indicator of absorbable energy at that MSE. The functional correlation may vary depending upon application and/or a desired target effect, e.g., a more uniform energy distribution profile may be desired across object 11. The invention is not limited to any particular scheme, but rather may encompass any technique for controlling the energy supplied by taking into account an indication of absorbable energy.

In certain embodiments, the at least one processor may be configured to cause energy to be supplied to the at least one radiating element in at least a subset of the plurality of MSEs, wherein energy transmitted to the zone at each of the subset of MSEs is inversely related to the absorbable energy value at the corresponding MSE. Such an inverse relationship may involve a general trend—e.g., when an indicator of absorbable energy in a particular MSE subset (i.e., one or more MSEs) tends to be relatively high, the actual incident energy at that MSE subset may be relatively low. When an indicator of absorbable energy in a particular MSE subset tends to be relatively low, the incident energy may be relatively high. This substantially inverse relationship may be even more closely correlated. For example, the transmitted energy may be set such that its product with the absorbable energy value (i.e., the absorbable energy by object 11) is substantially constant across the MSEs applied.

Some exemplary energy delivery schemes may lead to more spatially uniform energy absorption in the object. As used herein, "spatial uniformity" may refer to a condition where the absorbed energy across the object or a portion (e.g., a selected portion) of the object that is targeted for energy application is substantially constant (for example per volume unit or per mass unit). In some embodiments, the energy absorption is considered "substantially constant" if the variation of the dissipated energy at different locations of the object is lower than a threshold value. For instance, a deviation may be calculated based on the distribution of the dissipated energy in the object, and the absorbable energy is considered "substantially constant" if the deviation between the dissipation values of different parts of the object is less than 50%. Because in many cases spatially uniform energy absorption may result in spatially uniform temperature increase, consistent with the presently disclosed embodiments, "spatial uniformity" may also refer to a condition where the temperature increase across the object or a portion of the object that is targeted for energy application is substantially constant. The temperature increase may be measured by a sensing device, for example a temperature sensor provided in zone 9. In some embodiments, spatial uniformity may be defined as a condition, where a given property of the object is uniform or substantially uniform after processing, e.g., after a heating process. Examples of such properties may include temperature, readiness degree (e.g., of food cooked in the oven), mean particle size (e.g., in a sintering process), etc.

In order to achieve control over the spatial pattern of energy absorption in an object or a portion of an object, controller 101 may be configured to hold substantially constant the amount of time at which energy is supplied to antennas 102 at each MSE, while varying the amount of power supplied at each MSE as a function of the absorbable energy value. In some embodiments, controller 101 may be configured to cause the energy to be supplied to the antenna at a particular MSE or MSEs at a power level substantially equal to a maximum power level of the device and/or the amplifier at the respective MSE(s).

Alternatively or additionally, controller 101 may be configured to vary the period of time during which energy is applied to each MSE as a function of the absorbable energy value. At times, both the duration and power at which each MSE is applied are varied as a function of the absorbable energy value. Varying the power and/or duration of energy supplied at each MSE may be used to cause substantially uniform energy absorption in the object or to have a controlled spatial pattern of energy absorption, for example, based on feedback from the dissipation properties of the object at each transmitted MSE.

Consistent with some other embodiments, controller 101 may be configured to cause the amplifier to supply no energy at all at particular MSE(s). Similarly, if the absorbable energy value exceeds a predetermined threshold, controller 101 may be configured to cause the antenna to supply energy at a power level less than a maximum power level of the antenna.

Because absorbable energy can change based on a host of factors including object temperature, in some embodiments, it may be beneficial to regularly update absorbable energy values and adjust energy application based on the updated absorption values. These updates can occur multiple times a second, or can occur every few seconds or longer, depending on the requirements of a particular application.

In accordance with an aspect of some embodiments of the invention, the at least one processor (e.g., controller 101 or processor 2030) may be configured to determine a desired and/or target energy absorption level at each of a plurality of MSEs and adjust energy supplied from the antenna at each MSE in order to obtain the target energy absorption level at each MSE. For example, controller 101 may be configured to target a desired energy absorption level at each MSE in order to achieve or approximate substantially uniform energy absorption across a range of MSEs.

Alternatively, controller 101 may be configured to provide a target energy absorption level at each of a plurality of object portions, which collectively may be referred to as an energy absorption profile across the object. An absorption profile may include uniform energy absorption in the object, non-uniform energy absorption in the object, differing energy absorption values in differing portions of the object, substantially uniform absorption in one or more portions of the object, or any other desirable pattern of energy absorption in an object or portion(s) of an object.

In some embodiments, the at least one processor may be configured to adjust energy supplied from the antenna at each MSE in order to obtain a desired target energy effect and/or energy effect in the object, for example: a different amount of energy may be provided to different parts and/or regions of the object. An exemplary method for applying a different amount of energy to different regions of an object is described in U.S. Provisional Patent Application No. 61/282,981 entitled "Modal Analysis", U.S. Provisional Patent Application No. 61/282,983 entitled "Loss Profile Analysis" and U.S. Provisional Patent Application No. 61/282,980 entitled "Spatially Controlled Energy Delivery" and in International Application No. PCT/IL2010/000,381 entitled "Device and Method for Heating Using RF Energy", all of which are incorporated herein by reference.

In some embodiments, a resolution of the different regions (for example, to which different amounts of energy are applied) and/or a resolution of a discretization of the zone (e.g., the zone may be divided into a plurality of regions) may be a fraction of the wavelength of the delivered EM energy, e.g., on the order of $\lambda/10$, $\lambda/5$, $\lambda/2$. For example, for 900 MHz, the corresponding wavelength ($\lambda$) in air ($\in=1$) is 33.3 cm and the resolution may be on the order of 3 cm, e.g., $(3 \text{ cm})^3$ resolution. In water, for example, the wavelength is approximately 9 times shorter at the same frequency (900 MHz), thus the resolution may be in the order of 0.33 cm, e.g., $(0.33 \text{ cm})^3$. In meat, for example, the wavelength corresponding to frequency of 900 MHz is about 7 times shorter than in air and the resolution may be in the order of 0.4 cm, e.g., $(0.4 \text{ cm})^3$.

Figure 4:
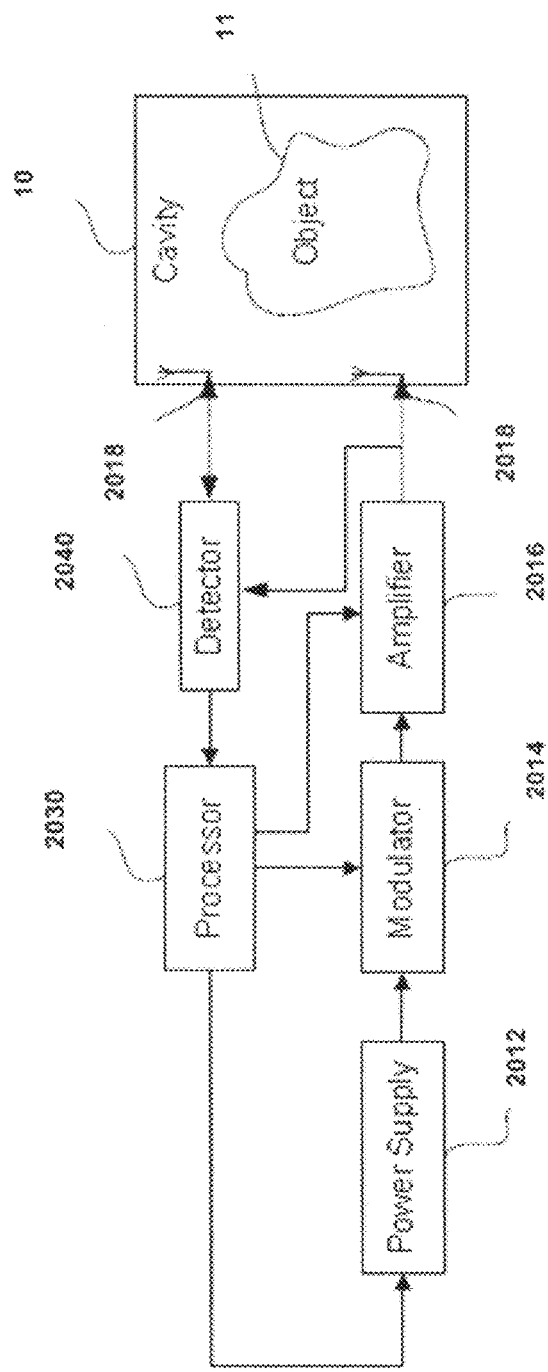
FIG. 4 is a diagrammatic representation of an apparatus for applying electromagnetic energy to an object, in accordance with some exemplary embodiments of the present invention.

Reference in now made to FIG. 4, which provides a diagrammatic representation of an exemplary apparatus 100 for applying electromagnetic energy to an object, in accordance with some embodiments of the present invention. In accordance with some embodiments, apparatus 100 may include a processor 2030 which may regulate modulations performed by modulator 2014. In some embodiments, modulator 2014 may include at least one of a phase modulator, a frequency modulator, and an amplitude modulator configured to modify the phase, frequency, and amplitude of the AC waveform, respectively. Processor 2030 may alternatively or additionally regulate at least one of location, orientation, and configuration of each radiating element 2018, for example, using an electromechanical device. Such an electromechanical device may include a motor or other movable structure for rotating, pivoting, shifting, sliding or otherwise changing the orientation and/or location of one or more of radiating elements 2018. Alternatively or additionally, processor 2030 may be configured to regulate one or more field adjusting elements located in the energy application zone, in order to change the EM field pattern in the zone.

In some embodiments, apparatus 100 may involve the use of at least one source configured to deliver electromagnetic energy to the energy application zone. By way of example, and as illustrated in FIG. 4, the source may include one or more of a power supply 2012 configured to generate electromagnetic waves that carry electromagnetic energy. For example, power supply 2012 may be a magnetron configured to generate high power microwave waves at a predetermined wavelength or frequency. Alternatively, power supply 2012 may include a semiconductor oscillator, such as a voltage controlled oscillator, configured to generate AC waveforms (e.g., AC voltage or current) with a constant or varying frequency. AC waveforms may include sinusoidal waves, square waves, pulsed waves, triangular waves, or another type of waveforms with alternating polarities. Alternatively, a source of electromagnetic energy may include any other power supply, such as electromagnetic field generator, electromagnetic flux generator, or any mechanism for generating vibrating electrons.

In some embodiments, apparatus 100 may include a phase modulator (not illustrated) that may be controlled to perform a predetermined sequence of time delays on an AC waveform, such that the phase of the AC waveform is increased by a number of degrees (e.g., 10 degrees) for each of a series of time periods. In some embodiments, processor 2030 may dynamically and/or adaptively regulate modulation based on feedback from the energy application zone. For example, processor 2030 may be configured to receive an analog or digital feedback signal from detector 2040, indicating an amount of electromagnetic energy received from cavity 10, and processor 2030 may dynamically determine a time delay at the phase modulator for the next time period based on the received feedback signal.

In some embodiments, apparatus 100 may include a frequency modulator (not illustrated). The frequency modulator may include a semiconductor oscillator configured to generate an AC waveform oscillating at a predetermined frequency. The predetermined frequency may be in association with an input voltage, current, and/or other signal (e.g., analog or digital signals). For example, a voltage controlled oscillator may be configured to generate waveforms at frequencies proportional to the input voltage.

Processor 2030 may be configured to regulate an oscillator (not illustrated) to sequentially generate AC waveforms oscillating at various frequencies within one or more predetermined frequency bands. In some embodiments, a predetermined frequency band may include a working frequency band, and the processor may be configured to cause the transmission of energy at frequencies within a sub-portion of the working frequency band. A working frequency band may be a collection of frequencies selected because, in the aggregate, they achieve a desired goal, and there is diminished need to use other frequencies in the band if that sub-portion achieves the goal. Once a working frequency band (or subset or sub-portion thereof) is identified, the processor may sequentially apply power at each frequency in the working frequency band (or subset or sub-portion thereof). This sequential process may be referred to as "frequency sweeping." In some embodiments, each frequency may be associated with a feeding scheme (e.g., a particular selection of MSEs). In some embodiments, based on the feedback signal provided by detector 2040, processor 2030 may be configured to select one or more frequencies from a frequency band, and regulate an oscillator to sequentially generate AC waveforms at these selected frequencies.

Alternatively or additionally, processor 2030 may be further configured to regulate amplifier 2016 to adjust amounts of energy delivered via radiating elements 2018, based on the feedback signal. Consistent with some embodiments, detector 2040 may detect an amount of energy reflected from the energy application zone and/or energy transmitted at a particular frequency, and processor 2030 may be configured to cause the amount of energy delivered at that frequency to be low when the reflected energy and/or transmitted energy is low. Additionally or alternatively, processor 2030 may be configured to cause one or more antennas to deliver energy at a particular frequency over a short duration when the reflected energy is low at that frequency.

In some embodiments, the apparatus may include more than one EM energy generating component. For example, more than one oscillator may be used for generating AC waveforms of differing frequencies. The separately generated AC waveforms may be amplified by one or more amplifiers. Accordingly, at any given time, radiating elements 2018 may be caused to simultaneously transmit electromagnetic waves at, for example, two differing frequencies to cavity 10.

Processor 2030 may be configured to regulate the phase modulator in order to alter a phase difference between two electromagnetic waves supplied to the energy application zone. In some embodiments, the source of electromagnetic energy may be configured to supply electromagnetic energy in a plurality of phases, and the processor may be configured to cause the transmission of energy at a subset of the plurality of phases. By way of example, the phase modulator may include a phase shifter. The phase shifter may be configured to cause a time delay in the AC waveform in a controllable manner within cavity 10, delaying the phase of an AC waveform anywhere from between 0-360 degrees.

In some embodiments, a splitter (not illustrated) may be provided in apparatus 100 to split an AC signal, for example generated by an oscillator, into two AC signals (e.g., split signals). Processor 2030 may be configured to regulate the phase shifter to sequentially cause various time delays such that the phase difference between two split signals may vary over time. This sequential process may be referred to as "phase sweeping." Similar to the frequency sweeping described above, phase sweeping may involve a working subset of phases selected to achieve a desired energy application goal.

The processor may be configured to regulate an amplitude modulator in order to alter an amplitude of at least one electromagnetic wave supplied to the energy application zone. In some embodiments, the source of electromagnetic energy may be configured to supply electromagnetic energy in a plurality of amplitudes, and the processor may be configured to cause the transmission of energy at a subset of the plurality of amplitudes. In some embodiments, the apparatus may be configured to supply electromagnetic energy through a plurality of radiating elements, and the processor may be configured to supply energy with differing amplitudes simultaneously to at least two radiating elements.

Although FIG. 4 and FIGS. 2A and 2B illustrate circuits including two radiating elements (e.g., antennas 16, 18; 210, 220; or 2018), it should be noted that any number of radiating elements may be employed, and the circuit may select combinations of MSEs through selective use of radiating elements. By way of example only, in an apparatus having three radiating elements A, B, and C, amplitude modulation may be performed with radiating elements A and B, phase modulation may be performed with radiating elements B and C, and frequency modulation may be performed with radiating elements A and C. In some embodiments amplitude may be held constant and field changes may be caused by switching between radiating elements and/or subsets of radiating elements. Further, radiating elements may include a device that causes their location or orientation to change, thereby causing field pattern changes. The combinations are virtually limitless, and the invention is not limited to any particular combination, but rather reflects the notion that field patterns may be altered by altering one or more MSEs.

In some embodiments in accordance with the present invention, an apparatus or a method may involve at least one field rotating element. Consistent with embodiments of the present invention, a field rotating element may be include any element—and may be solid, liquid, gas or plasma. Consistent with embodiments of the present invention, a field rotating element may have a magnetic anisotropy, an electric anisotropy, or both magnetic and electric anisotropies. A field rotating element may be capable of moving and/or rotating in time EM field patterns and/or modes excited in an energy application zone. It is to be noted that in order to move or rotate an EM field pattern, the field rotating element may interact with the EM field pattern. It may be advantageous, in some applications, if a portion of the field rotating element is located in the energy application zone. The field rotating element may alter a pattern or mode of an excited field such that the pattern or mode moves or rotates around an axis, which may be a symmetry axis of the EM field pattern.

The field rotating element may be composed of or include material having magnetic anisotropy, electric anisotropy, or both magnetic and electric anisotropies. The anisotropy may be inherent in the material or imposed externally. For example, magnetic anisotropy may be created by application of an external magnetic field to a magnetizable element.

The magnetic anisotropy of a material is mathematically defined by the magnetic permeability matrix μ, also known as the permeability tensor. A material is said to have magnetic anisotropy when the martial has at least two different, directionally dependent permeability values. Such magnetic anisotropy may be expressed mathematically as having at least two different $\mu_{ij}$ non-zero values in the off-diagonal components of the permeability tensor, μ.

The electric anisotropy of a material is defined as heterogeneity in the electric permittivity matrix ∈, also known as the permittivity tensor. A material is said to have electric anisotropy when the martial has at least two different, directionally dependent permittivity values. Electrical anisotropy may be expressed by two different non-zero $\in_{ij}$ in the off-diagonal components of the permittivity tensor, ∈.

In some embodiments, the field rotating element may cause an EM field pattern to move or rotate. Due to this movement or rotation, a time average of the EM energy distribution in the energy application zone may be more uniform than a time average of the energy distribution in the energy application zone under similar conditions, but without the movement or rotation of the EM field pattern.

Figure 5:
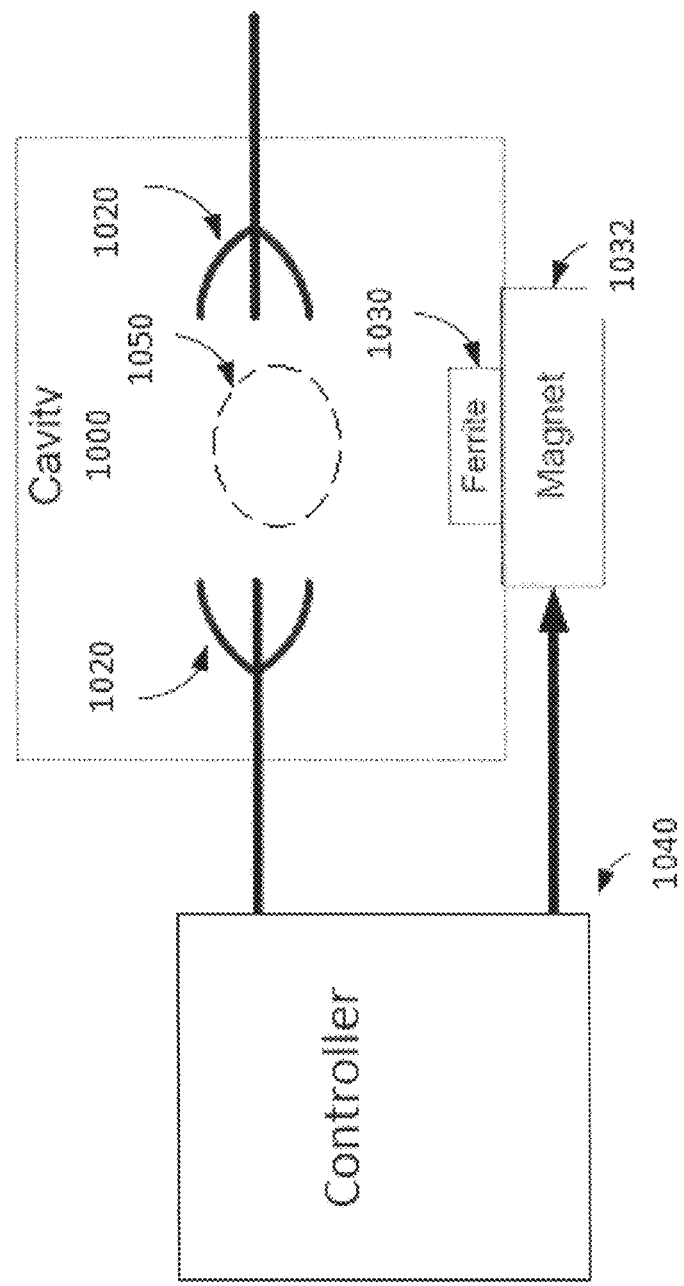
FIG. 5 is a diagrammatic representation of an apparatus for exciting a rotating field pattern in an energy application zone in accordance with some exemplary embodiments of the present invention.

A controller, for example controller 1040 illustrated in FIG. 5 or controller 101 illustrated in FIG. 1, may determine an MSE or an amount of energy transferred in an MSE according to a value indicative of energy absorbable by an object or load at that MSE. The value indicative of energy absorbable by the object may include any property related to the ability of the object to absorb EM energy. The property may or may not depend on the MSE. Examples of MSE-dependent properties include: DR (dissipation ratio), an energy dissipation rate in each MSE (e.g., power absorbed in the object at each MSE) and dielectric properties of the object. Examples of MSE independent properties include the total energy dissipated in the object at a given period of time.

Controller 1040 may be further configured to control the anisotropy of the field rotating element such that the EM field pattern excited in the energy application zone may rotate. A rotation rate or frequency of rotation of the EM field pattern may have a similar value to the frequency of the EM radiation creating the EM field pattern. For example, transferring energy at an MSE having frequency of 1 GHz, to an energy application zone including the field rotating element, may result in $10^9$ revolutions of the excited electromagnetic field pattern per second. Optionally, controller 1040 may also or alternatively control other aspects of the rotation.

In some embodiments, the anisotropy may be controlled by applying an external field to the field rotating element. The field rotating element may include material that changes its magnetic and/or electric anisotropy when exposed to an external magnetic and/or electric field. Controller 1040 may be configured to change, modify or alter a magnitude of the external magnetic and/or electric field to control the anisotropy. Controlling the anisotropy may be achieved by setting one or more values of μij and/or ∈ij in the permeability and permittivity tensors respectively.

Figure 12:
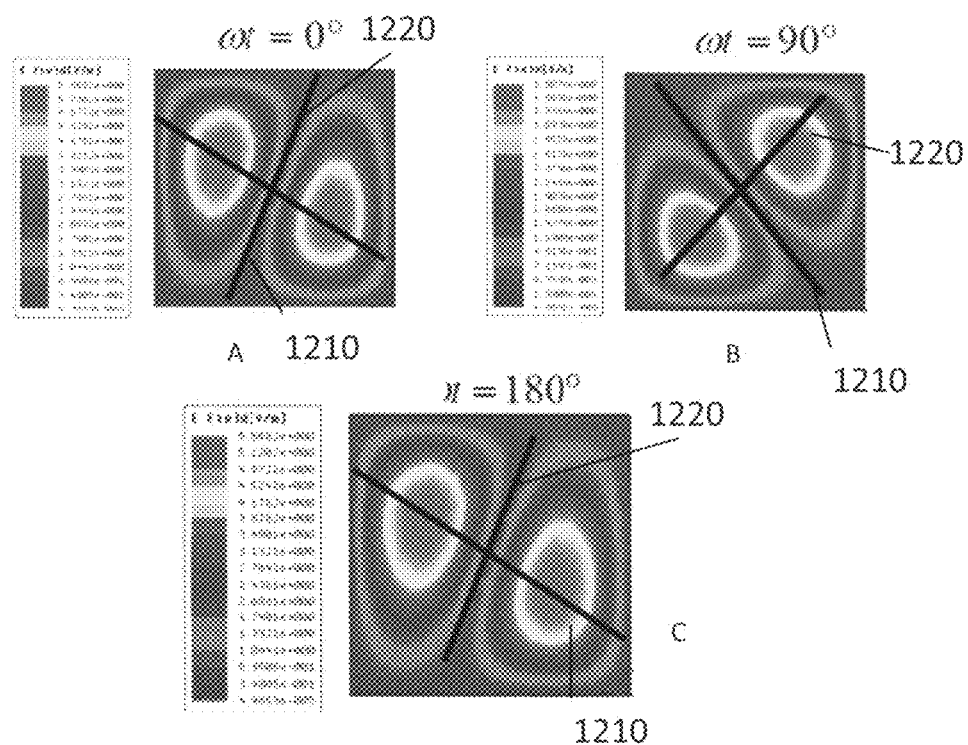
FIG. 12 is a graphical representation of simulation results of an EM field pattern obtained in a rectangular resonance cavity in several points in time-phase in accordance with some exemplary embodiments of the present invention.
Figure 13:
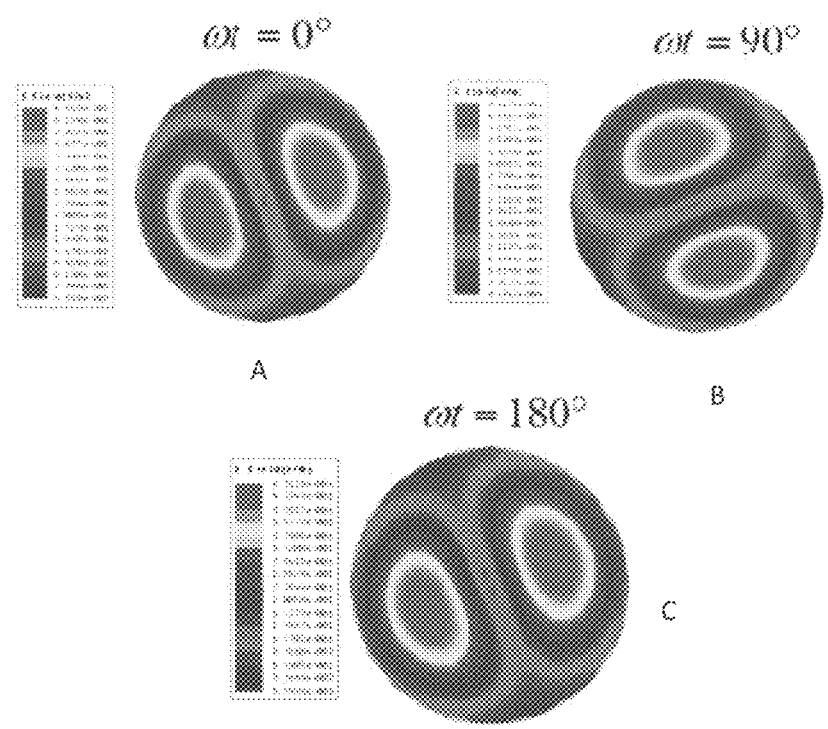
FIG. 13 is a graphical representation of simulation results of the changes in an EM field pattern obtained in a circular resonance cavity in several points in time-phase in accordance with some exemplary embodiments of the present invention.

EM field patterns having even number of intensity maxima or peaks may rotate around a symmetry axis. Examples of field patterns rotated around an axis of symmetry are illustrated in FIG. 12 and FIG. 13.

In some embodiments of the invention, the presence of a field rotating element in the EM application zone (e.g., resonator cavity) may lead to a breaking of spatial and/or temporal symmetry and causing continuous changes in positions of EM field pattern maxima and minima.

As shown in FIG. 5, a magnetizable ferrite element 1030 may be included in cavity 1000. In this example, cavity 1000 serves as an energy application zone and the magnetizable ferrite element serves as a field rotating element. The magnetizable ferrite element 1030 may be constructed of any ferrite-including material, including, e.g., dielectric ferrite and metallic ferrite including materials. A "ferrite" or "ferrite including material" may include any of several magnetic substances that consist essentially of ferric oxide alone and/or combined with the oxides of one or more other metals (e.g., the oxides of manganese, nickel, or zinc). Ferrites may include dielectric ferrites, metallic ferrites and combinations thereof. A dielectric ferrite may include a non-conductive ferromagnetic ceramic compound derived from iron oxides such as hematite ($Fe_2O_3$) or magnetite ($Fe_3O_4$) as well as oxides of other metals. A metallic ferrite may include any form of iron, steel, or solid solution with iron as a major constituent, such as those with a body centered cubic (BCC) crystal structure. "Ferrite" may also include matter having or being capable of having magnetic properties. A ferrite may have inherent anisotropy, nonreciprocal, and gyrotropic properties. A ferrite may be a magnetic dielectric, which may allow for electromagnetic waves to penetrate into the ferrite and may result in an effective interaction between the electromagnetic waves and magnetic substance within the ferrite.

Non-limiting examples of ferrite materials that may be used with the invention include a class of chemical compounds with the formula $AB_2O_4$, where A and B represent a set of metal cations inclusive of iron. For example, ferrite materials may include $Fe_2O_3$, $Fe_3O_4$, manganese-zinc (MnZn, with the formula $Mn_aZn_{(1-a)}Fe_2O_4$), nickel-zinc (NiZn, with the formula $Ni_aZn_{(1-a)}Fe_2O_4$), iron and barium or strontium oxides, or any other material or composite capable of being magnetized, as discussed herein.

Figure 7B:
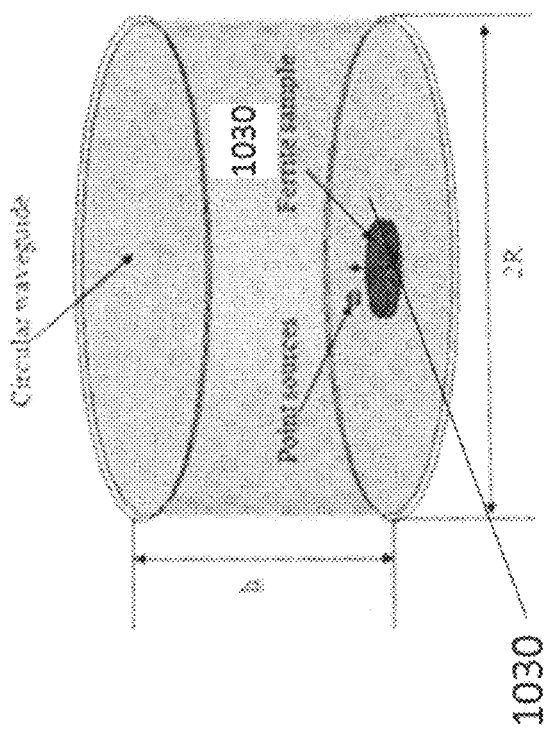
FIGS. 7A and 7B are views of rectangular and circular resonant cavities having field rotating elements in accordance with some exemplary embodiments of the present invention.
Figure 7A:
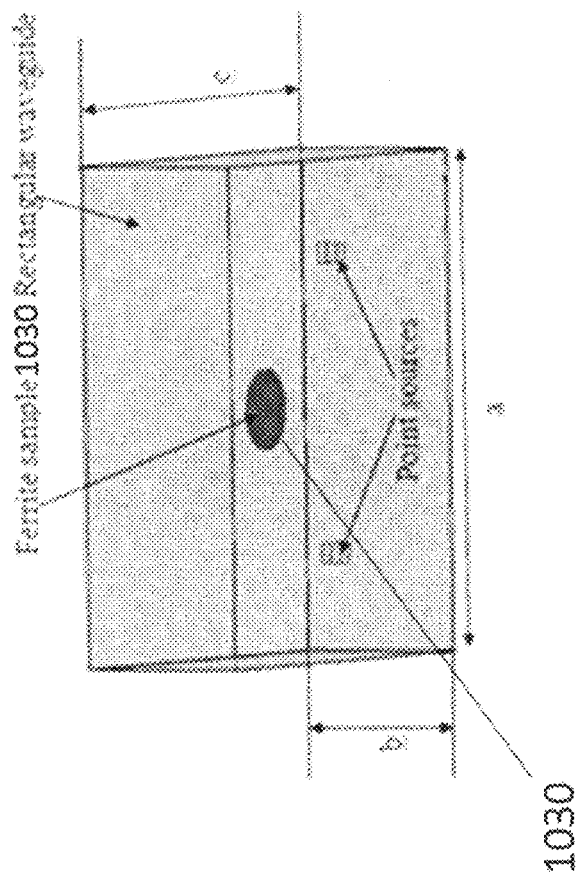

A field rotating element or a ferrite element may include a piece of ferrite material in a contiguous solid mass, a particle, a composite form, or any other form capable of being magnetized. Although ferrite element 1030 is illustrated in FIG. 5 as having a box-like shape and in FIGS. 7A and 7B is illustrated in a disk-like shape, the shapes illustrated are for exemplary purposes only, and any other suitable shape or combination of shapes may be used.

In accordance with some embodiments of the invention, the field rotating element (e.g. the ferrite element) may be magnetizable. That is it may have the ability to be magnetized under certain conditions. One exemplary condition under which it may be magnetized is when the field rotating element is in the presence of a static, quasi-static or modulated magnetic field. Such magnetic fields may be formed by a magnetic field source. For example, the magnetic field source may be a magnet (for example, magnet 1032 illustrated in FIG. 5) and ferrite element 1030 may also be positioned in the vicinity of the magnetic field source (e.g., in the vicinity of magnet 1032). The magnetizable ferrite element 1030 may, for example, become magnetized as the result of contact with the magnetic field of magnet 1032. On the other hand, as the strength of the magnetic field decreases, for instance when magnet 1032 is moved farther away from ferrite 1030, the degree of magnetization of the ferrite may decrease. The latter may happen, for example, due to a weaker interaction between the magnetic field and the ferrite material. When an interaction between the magnetic field and the ferrite material is below a certain level, for instance when magnet 1032 is removed from the apparatus shown in FIG. 5, the magnetization of ferrite 1030 may become so weak that the ferrite is essentially non-magnetized, although still magnetizable. Similarly, as the magnetic field becomes stronger, the interaction between the magnetic field and the ferrite material may also become stronger and increase the magnetization of the ferrite. However, the magnetization of the ferrite may not be linearly related to the strength of the magnetic field. For example, the magnetization may become saturated if the strength of the magnetic field is above a certain level.

While a permanent magnet can be used as a magnetic source to magnetize ferrite element 1030, other mechanisms of magnetization can also, or alternatively, be used. For example, the magnetic source may be an electromagnet and the magnetization of the ferrite can occur using an electromagnet (e.g., electromagnet 1034 illustrated in FIG. 6).

Such an electromagnet can be any type of device that receives an electric signal and generates a magnetic field in response. The electric signal may be received in the form of an electric current, electric voltage, electric charge, electromagnetic fields, etc. In an electromagnet, the magnetic field may depend on the electric signal and, for example, disappear or diminish when the electric signal ceases. An electromagnet may be made, for example, of a wire wound into a coil where turns of wire are arranged laterally with respect to one another. The coil may be shaped as a straight tube (e.g., solenoid), and may be bent into a donut shape so that the ends meet (e.g., a toroid). A coil may also include a "core" of ferromagnetic material, such as iron, to, among other things, magnify the magnetic field generated by the coil. Although in FIG. 6, the electromagnet is placed outside the cavity, it should be understood that this is by way of example only. The magnetic source, e.g., an electromagnet, may alternatively be placed inside the cavity, may be included within the field rotating element (e.g., ferrite element), may be included in the object (e.g., object 1050), may be included on or inside a cavity wall, and/or may be place in any other location. The electromagnet may also be attached to or partially attached to the ferrite element, optionally forming a single field rotating element. Other configurations are also possible as long as the magnetic field generated by the magnetic source (e.g., electromagnet) may interact with the magnetizable element. When more than one magnetic source is used or that the magnetic source is other than an electromagnet, the magnetic sources may be located in any location as described above.

According to another aspect of some embodiments of the invention, the at least one field rotating element (e.g., magnetizable ferrite element) may be generally disk-shaped. FIGS. 7A and 7B, for example, illustrate magnetizable ferrite element 1030 in the shape of a disk. However, as mentioned previously, the invention is not limited to a particular shape of the field rotating element. For example, the shape of a field rotating element may be spherical, cylindrical, cubic, rectangular, or any other suitable shapes.

Figure 6:
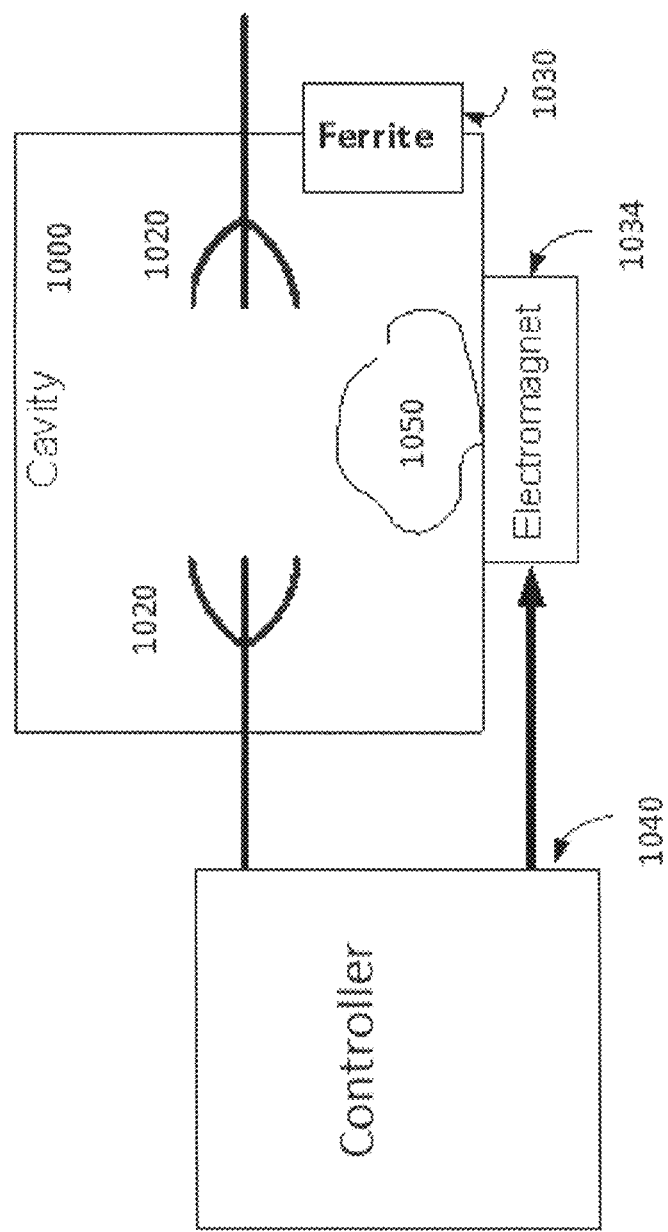
FIG. 6 is a diagrammatic representation of an apparatus for exciting a rotating field pattern in an energy application zone in accordance with some exemplary embodiments of the present invention.

In accordance with some embodiments of the invention, a magnetic source for magnetizing the at least one field rotating element (e.g., magnetizable field rotating element) may be provided. A magnetic source may include a magnet, an electromagnet, or any other magnetic source(s) which may magnetize the magnetizable field rotating element. The magnetic source may be inside the cavity, outside the cavity, or partially inside the cavity. For example, FIG. 5 shows a magnetic source (e.g., magnet 1032) used to magnetize field rotating element (e.g., ferrite element 1030). FIG. 6 shows another magnetic source (e.g., electromagnet 1034).

In accordance with some embodiments of the invention, the magnetic source may be adjustable to alter magnetization of the at least one magnetizable field rotating element. For example, FIG. 6 shows electromagnet 1034 which is adjustable by changing the electric current from a current source supplied to the electromagnet, thereby adjusting the magnetic field and the magnetization of the field rotating element. The current source may be, for example, part of controller 1040.

The magnetic source may be configured to apply a substantially random magnetic field (e.g., a magnetic field that takes on a number of random values and/or non-random values in a random order) to the at least one magnetizable field rotating element. The random values may be selected, for example, from a group of predetermined values. For example, in FIG. 6, a random signal generator, which may be part of controller 1040, may be used to control the electric current supplied to electromagnet 1034, thereby creating a substantially random magnetic field in the field rotating element.

Alternatively or additionally, the magnetic source may be configured to apply a predetermined magnetic field to the at least one magnetizable field rotating element. The predetermined values may be selected to rotate EM field patterns of predetermined frequencies. For example, in FIG. 6, a signal generator (which may be part of controller 1040) may be used to control the electric current supplied to electromagnet 1034 in accordance with the EM field pattern transferred to the energy application zone by radiating elements 1020 (e.g., antennas 16, 18; 210, 220, or 2018).

In accordance with some embodiments of the invention, one or more apparatuses or methods may include a controller configured to alter a magnetic field applied by the magnetic source. The controller may be configured to control a direction of the magnetic field. For example, in FIG. 6, when controller 1040 changes the direction of the electric current supplied to electromagnet 1034, the direction of the magnetic field generated by the electromagnet may change. The controller may also be configured to control a strength of the magnetic field. For example, in FIG. 6, when controller 1040 adjusts the electric current value supplied to electromagnet 1034, the strength of the magnetic field generated by the electromagnet may change. The controller may also control the distance between the electromagnet and the field rotating element (e.g., ferrite element), which may also change the strength of the magnetic field. The controller may also be configured to control a duration of magnetic application to the at least one magnetizable field rotating element (e.g., ferrite element). For example, the controller may supply electric current to the electromagnet for fixed duration, such as 10 seconds, during a magnetizing process. In this exemplary case, the time duration of the magnetic field applied to the ferrite element will be about 10 seconds. Other durations are also possible. The controller may also be configured to control timing of the application of a magnetic field to the at least one magnetizable ferrite element. For example, in FIG. 6, the controller may control the application electric current to the electromagnet, thereby controlling a timing of each magnetization process.

In some embodiments, field rotating element (e.g., ferrite element 1030) may have electric anisotropy or gain electric anisotropy when exposed to an external field (e.g., an external electric field).

In accordance with some embodiments of the invention, the at least one field rotating element may be located at least partially inside the energy application zone. For example, the field rotating element may be located inside the energy application zone, or a part of the field rotating element may be located in the zone. The energy application zone is not necessarily coincident with a chamber in which an energy application process occurs. For example, an energy application zone may include regions where it may or may not be possible to place an object.

In accordance with one embodiment of the invention, the at least one field rotating element and the applied magnetic field (which may be, for example, a static, quasi-static or modulated field) may be configured such that when radiating element 1020 supplies EM waves into the energy application zone, the at least one EM field pattern is modified. The term "field pattern" of "EM field pattern" includes a mode, a plurality of modes, spatial distribution of field intensity, and/or maxima of an EM field.

Due to non-zero off-diagonal components of the permeability tensor of the field rotating element, the phase of the wave reflected from the field rotating element may depend on the direction of the incident wave. This dependence increases as the field rotating element is placed in greater proximity to a ferromagnetic resonance (FMR). In some resonant structures with a field rotating element, the electromagnetic field eigenfunctions may be complex (i.e., have non-zero imaginary part in their mathematical representation). That is, the fields of eigen oscillations may be not the same as fields of standing waves even when the eigen frequencies of an open resonant structure portion with a ferrite sample may be real. Due to the presence of magnetic and/or electric anisotropy in the resonator domain, the EM resonator may have odd-time-reversal symmetry. Specific field phase characteristics of EM resonators with field rotating element inclusions may occur from the reflection features of electromagnetic waves at a dielectric-ferrite interface, for example.

Figures 8A, 8B:
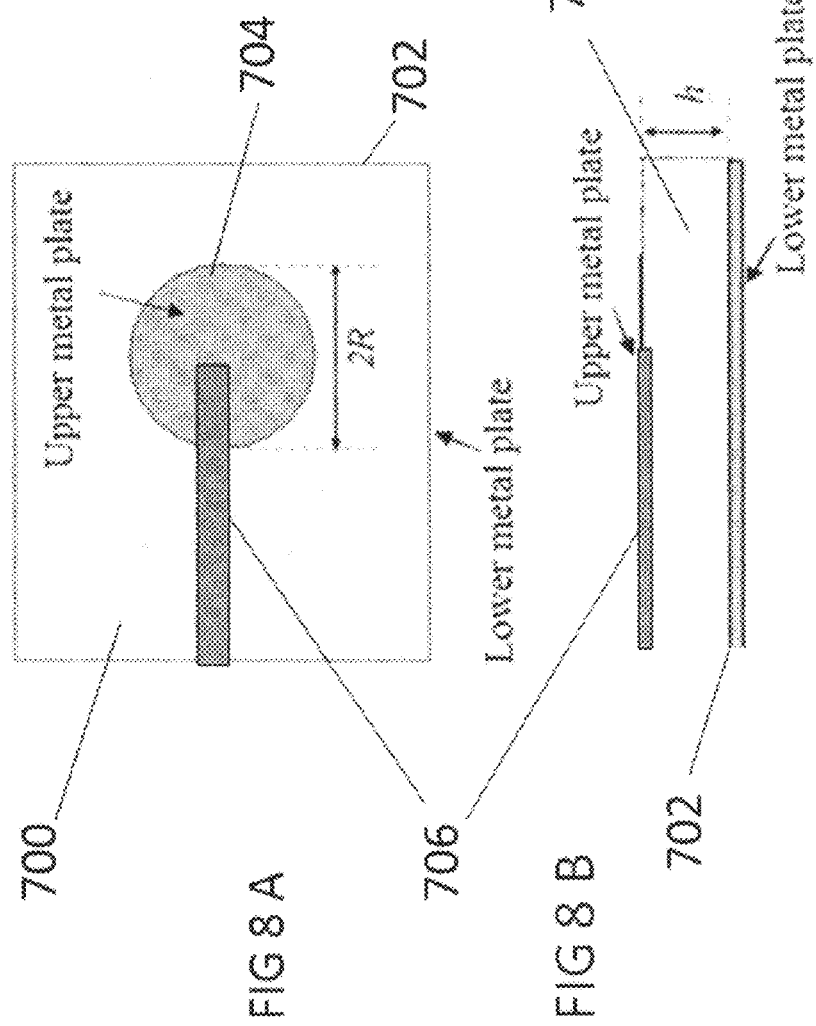
FIGS. 8A-8B represent top and side views of an energy application zone comprising a metal plate without a field rotating element in accordance with some exemplary embodiments of the present invention.

Consistent with some embodiments of the invention, the presence of a field rotating element in the energy application zone may lead to breaking of space and/or time symmetry and cause continuous changes in the positions of maxima and minima of the electric field forming the EM field pattern. For example, FIGS. 8A-8D illustrate examples of open resonance structures consisting of two parallel metal plates that may correspond to this regime. Open resonance structures may have non-metal wall portions made of an RF transparent material, for example. FIGS. 8A and 8C are top views and FIGS. 8B and 8D are side views. In contrast to the structures of FIGS. 7A and 7B, which may be closed structures, the structures of FIGS. 8A-8C may be open structures.

A closed structure is generally bounded about its periphery by RF reflective walls, for example. In an open structure the periphery may not be completely bounded with RF reflective walls. An open structure may include a circular upper metal plate 704 with a radius of R, as shown in FIG. 8A. A lower metal plate 702 may be a rectangular plate forming a ground plane. The distance between the two plates 702 and 704 is denoted as h in FIGS. 8B and 8D. Between the two plates 702 and 704 there may be a dielectric material (such as air or solid dielectric substrate). While the energy application zone (e.g., resonator cavity) illustrated in FIGS. 8A and 8B, does not contain a field rotating element, the energy application zone, illustrated in FIGS. 8C and 8D, includes a disk-shaped ferrite element 1030 with a thickness t and a surface radius R between the two plates 702 and 704.

Some or all of the forgoing functions and control schemes, as well as additional functions and control schemes, may be carried out, by way of example, using structures such as the electromagnetic energy application subsystems schematically depicted in FIG. 1 or FIG. 4 or FIG. 5. By way of example, alternative structures and/or apparatuses for applying electromagnetic energy are described in U.S. patent application Ser. No. 12/906,604 entitled "Food Preparation", U.S. Provisional Patent Application No. 61/322,133 entitled "System and Method for Applying Electromagnetic Energy", U.S. Provisional Patent Application No. 61/282,981 entitled "Modal Analysis", U.S. Provisional Patent Application No. 61/282,983 entitled "Loss Profile Analysis", and U.S. Provisional Patent Application No. 61/282,980 entitled "Spatially Controlled Energy Delivery" which are fully incorporated herein by reference. Within the scope of the invention, alternative structures might be used for accomplishing the functions described herein, as would be understood by a person of ordinary skill in the art, reading this disclosure.

Figure 9:
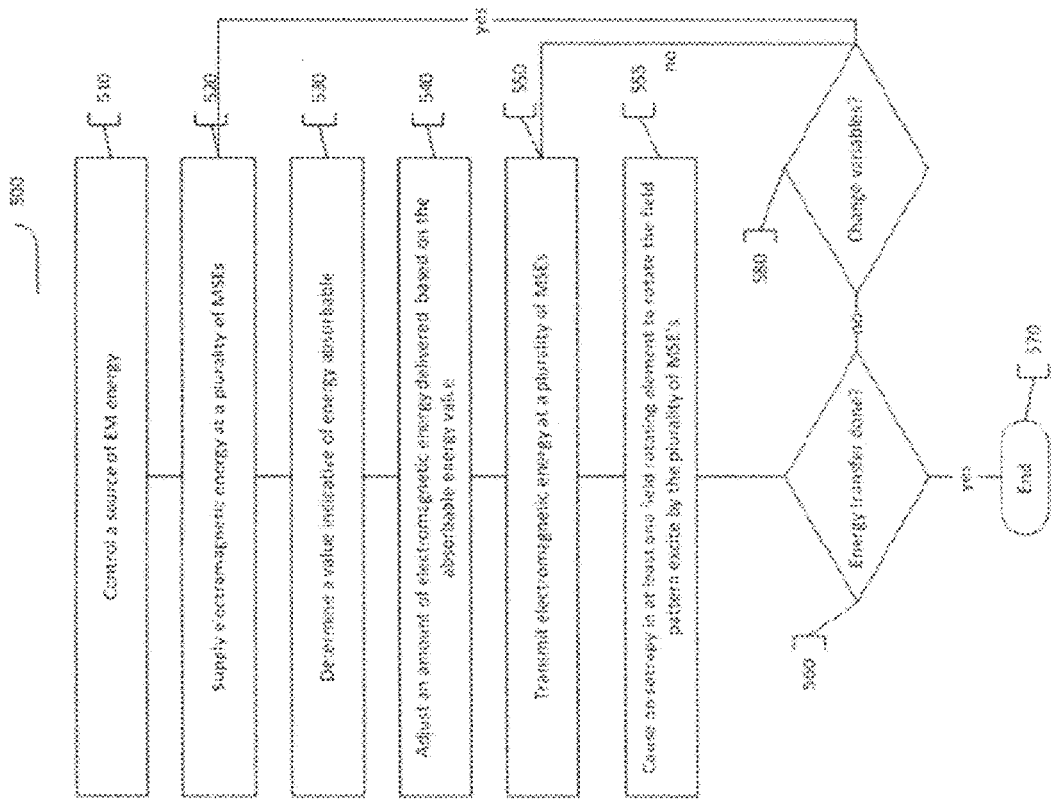
FIG. 9 is a flow chart of a method for applying electromagnetic energy to an energy application zone in accordance with some embodiments of the present invention.

FIG. 9 represents a method for applying electromagnetic energy to an object in accordance with some embodiments of the present invention. Electromagnetic energy may be applied to an object, for example, through at least one processor implementing a series of steps of method 500 of FIG. 9.

In certain embodiments, method 500 may involve controlling a source of electromagnetic energy (step 510). A "source" of electromagnetic energy may include any components that are suitable for generating electromagnetic energy. By way of example only, in step 510, the at least one processor may be configured to control electromagnetic energy application subsystem 96.

The source may be controlled to supply electromagnetic energy at a plurality of MSEs (e.g., at a plurality of frequencies and/or phases and/or amplitude etc.) to at least one radiating element, as indicated in step 520. Various examples of MSE supply, including sweeping, as discussed earlier, may be implemented in step 520. Alternatively or additionally, other schemes for controlling the source may be implemented so long as that scheme results in the supply of energy at a plurality of MSEs. The at least one processor may regulate subsystem 96 to supply energy at multiple MSEs to at least one transmitting radiating element (e.g., antenna 102 or radiating elements 1020). Additionally or alternatively, other schemes for controlling the source may be implemented. For example, one or more processing instructions and/or other information may be obtained from a machine readable element (e.g., barcode or RFID tag). The machine readable element may be read by a machine reader (e.g., a barcode reader, an RFID reader) and may be provided to the processor and/or the controller by an interface. In some embodiments, a user may provide one or more processing instructions and/or may provide other information relating to the object (e.g., an object type and/or weight) through an interface, e.g., a GUI interface, a touch screen etc.

In certain embodiments, the method may further involve determining a value indicative of energy absorbable by the object at each of the plurality of MSEs, in step 530. An absorbable energy value may include any indicator—whether calculated, measured, derived, estimated or predetermined—of an object's capacity to absorb energy. For example, computing subsystem 92 may be configured to determine an absorbable energy value, such as a dissipation ratio associated with each MSE.

In certain embodiments, the method may also involve adjusting an amount of electromagnetic energy incident or delivered at each of the plurality of MSEs based on the absorbable energy value at each MSE (step 540). For example, in step 540, at least one processor may determine an amount of energy to be delivered at each MSE, as a function of the absorbable energy value associated with that MSE.

In some embodiments, a choice may be made not to use all possible MSEs. For example, a choice may be made not to use all possible frequencies in a working band, such that the emitted frequencies are limited to a sub band of frequencies, for example, where the Q factor in that sub band is smaller or higher than a threshold. Such a sub band may be, for example 50 MHz wide 100 MHz wide, 150 MHz wide, or even 200 MHz wide or more.

In some embodiments, the at least one processor may determine a weight, e.g., power level, used for supplying the determined amount of energy at each MSE, as a function of the absorbable energy value. For example, amplification ratio of amplifier 2016 may be changed inversely with the energy absorption characteristic of object 11 at each MSE. In some embodiments, when the amplification ratio is changed inversely with the energy absorption characteristic, energy may be supplied for a constant amount of time at each MSE. Alternatively or additionally, the at least one processor may determine varying durations at which the energy is supplied at each MSE. For example, the duration and power may vary from one MSE to another, such that their product inversely correlates with the absorption characteristics of the object. In some embodiments, the controller may use the maximum available power at each MSE, which may vary between MSEs. This variation may be taken into account when determining the respective durations at which the energy is supplied at maximum power at each MSE. In some embodiments, the at least one processor and/or controller (e.g., controller 101) may determine both the power level and time duration for supplying the energy at each MSE.

In certain embodiments, the method may also involve transmitting and/or applying and/or supplying electromagnetic energy at a plurality of MSEs (step 550). Respective weights are optionally assigned to each of the MSEs to be transmitted (step 540) for example based on the absorbable energy value (as discussed above). Electromagnetic energy may be supplied to cavity 10 via antennas, e.g., antenna 102, 16, 18, 1020, or 2018. In some embodiments, MSEs may be swept sequentially, e.g., across a range of cavity's resonance MSEs or, along a portion of the range.

In some embodiments of the invention, method 500 may include rotating the EM field patterns excited by the MSE's, to achieve better uniformity in the energy delivery to the object (e.g., object 1050) located in an energy application zone (e.g., cavity 1000). An energy application zone may include at least one field rotating element having magnetic and/or electric anisotropy (e.g., ferrite 1030) configured to move or rotate the EM field pattern excited by radiating elements 1020. In step 555, the anisotropy of the field rotating element is controlled, optionally according to the transmitted MSE's, such that the EM field pattern in the energy application zone may rotate or move. Controlling the anisotropy may include calculating or determining an amount of external force (e.g. force resulting from a magnetic field) for altering the permeability and/or permittivity tensors of the field rotating element to be anisotropic. This may lead to the breaking of space and/or time symmetry and cause changes in the positions of maxima and minima of the field intensity in the excited EM field pattern.

Energy application may be interrupted periodically (e.g., several times a second) for a short time (e.g., only a few milliseconds or tens of milliseconds). Once energy application is interrupted, in step 560, it may be determined if the energy transfer should be terminated. Energy application termination criteria may vary depending on application. For example, for a heating application, termination criteria may be based on time, temperature, total energy absorbed, or any other indicator that the process at issue is compete. For example, heating may be terminated when the temperature of object 11 rises to a predetermined temperature threshold. If in step 560, it is determined that energy transfer should be terminated (step 560: yes), energy transfer may end in step 570. In another example, in thawing application, termination criteria may be any indication that the entire object is thawed.

If the criterion or criteria for termination is not met (step 560: no), it may be determined if variables should be changed and reset in step 580. If not (step 580: no), the process may return to step 550 to continue transmission of electromagnetic energy. Otherwise (step 580: yes), the process may return to step 520 to determine new variables. For example, after a time has lapsed, the object properties may have changed; which may or may not be related to the electromagnetic energy transmission. Such changes may include temperature change, translation of the object (e.g., if placed on a moving conveyor belt or on a rotating plate), change in shape (e.g., mixing, melting or deformation for any reason) or volume change (e.g., shrinkage or puffing) or water content change (e.g., drying), flow rate, change in phase of matter, chemical modification, etc. Therefore, at times and in response, it may be desirable to change the variables of transmission. The new variables that may be determined may include: a new set of MSEs, an amount of electromagnetic energy incident or delivered at each of the plurality of MSEs, weight, e.g., power level, of the MSE(s) and duration at which the energy is supplied at each MSE. Consistent with some of the presently disclosed embodiments, less MSEs may be swept in step 520 performed during the energy application phase than those swept in step 520 performed before the energy application phase, such that the energy application process is interrupted for a minimum amount of time.

The present invention is not limited to method 500 for applying electromagnetic energy to an object. Exemplary methods for applying electromagnetic energy are described in U.S. patent application Ser. No. 12/906,604, U.S. Provisional Patent Application Nos. 61/322,133, 61/282,981, 61/282,983 and 61/282,980 and also International Application Nos. PCT/IL10/000381 and PCT/IL10/000380, all of which are fully incorporated herein by reference. Within the scope of the invention, alternative methods might be used for accomplishing the functions described herein, as would be understood by a person of ordinary skill in the art, reading this disclosure.

EXAMPLES

Figure 10:
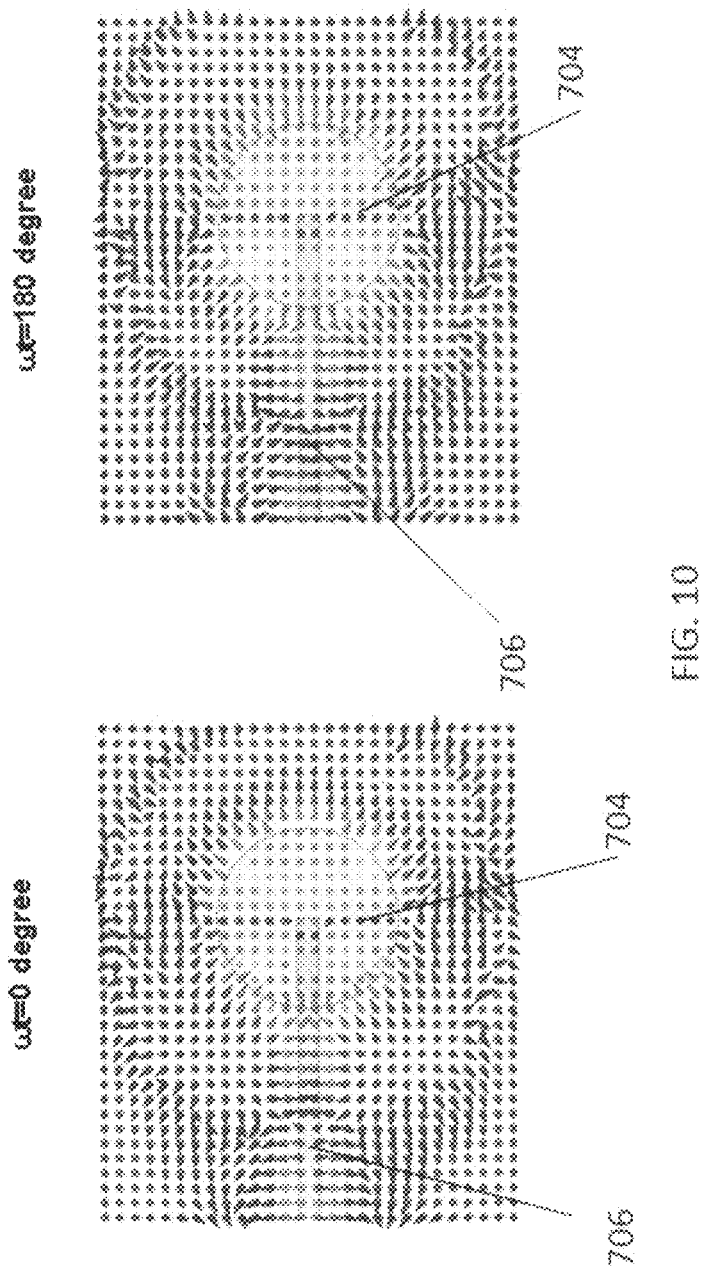
FIG. 10 is a graphical representation of simulation results of changes in time-phase in an EM field in a resonance cavity in the presence of a metal plate in accordance with some exemplary embodiments of the present invention.
Figure 11:
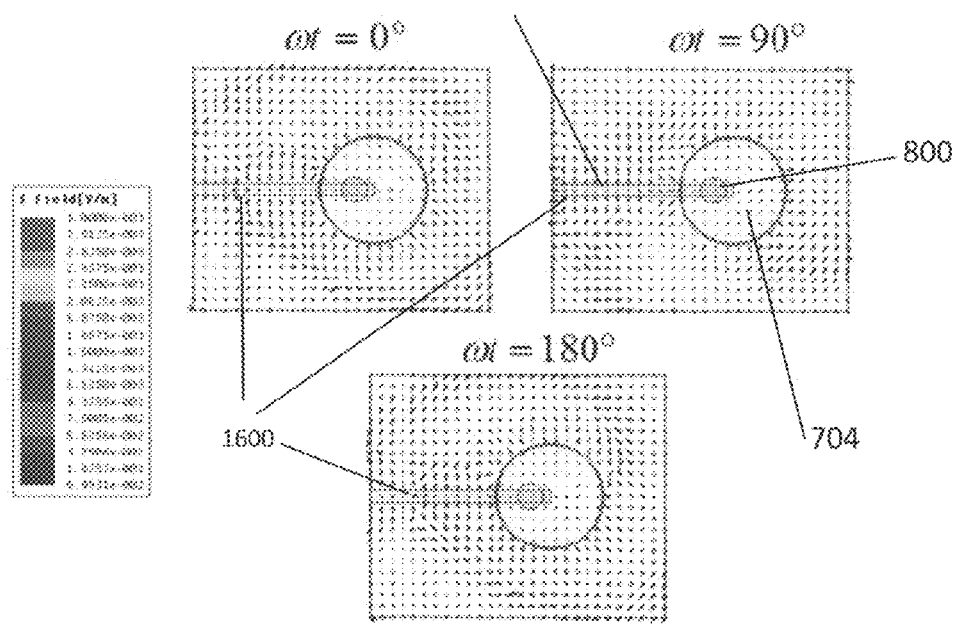
FIG. 11 is a graphical representation of simulation results of changes in time-phase in an EM field in a resonance cavity in the presence of a metal plate and a field rotating element in accordance with some exemplary embodiments of the present invention.

FIGS. 10-11 show differences in time-phase behavior of a field pattern obtained with and without a field rotating element, in the energy application zone illustrated in FIGS. 8A-D in accordance with simulations run on commercial numerical simulation software, including CST of CST of America Inc. and HFSS of Ansoft, for example.

FIG. 10 shows simulated EM field distributions obtained for an energy application zone 700 that does not contain a field rotating element. The different colors represent different field intensity, with red meaning high intensity and blue meaning low intensity. Full details on the colors are provided in the legend of FIG. 11. The shape of the dots shows the direction of the field at a particular location. FIGS. 10 and 11 show a cross-section of the obtained EM field pattern. The cross-section is parallel to the two metal plates 702 and 704, at the middle of the distance between them. FIGS. 10 and 11 show field distributions obtained at time-phase 0° and 180°, e.g., at ωt=0° and ωt=180°. The two distributions at time-phase 0° and 180° are similar, suggesting that the EM field pattern is essentially constant in time. This may be an indication that a standing wave is developed in energy application zone 700 in the absence of the field rotating element.

FIG. 11 shows field distributions obtained, in accordance with the simulation, in energy application zone 700 containing field rotating element 800. The different colors and shapes have the same meanings as in FIG. 10. FIG. 11 shows a cross-section of the obtained field pattern in substantially similar to the cross-section shown in FIG. 10. FIG. 11 shows field distributions obtained at time-phase 0°, 90° and 180°. The distributions time-phase 0°, 90° and 180° show that the field distribution changes in time, for example, the maxima of the EM field patterns (red dots), are seen to rotate clockwise, teaching that the EM field pattern changes in time, which may teach that a propagating wave is developed in energy application zone 700 in the presence of the field rotating element.

In accordance with some embodiments of the invention, the at least one field rotating element may be configured such that when the radiating element supplies electromagnetic waves into the zone, the EM field pattern obtained in the energy application zone moves in a rotating fashion. For example, the electromagnetic field pattern may rotate due to the interaction of the field rotating element and the electromagnetic waves. In some embodiments, a single mode in the resonant cavity may rotate. When a single mode in a resonant cavity is rotated along an axis, this may cause the maxima of the mode to cover, within a single rotation of the EM field pattern, a larger portion of the cavity than the portion covered by the same EM field pattern when it does not rotate. In other words, rotating the field pattern may more evenly distribute EM radiation. Similarly, when an object is located at least partially in the energy application zone, the rotation of the EM field pattern may cause the maxima of the field to cover larger portion of the object, depending on the object's location within the field and the field's path. Since the rotation may be at a very high rate (e.g., at the frequency of the applied field), the time averaged power loss density in the object may be more uniform than the time averaged power loss density in the object when the EM field pattern does not rotate. For example, referring to FIG. 11, due to the electromagnetic waves supplied from radiating element 706 interacting with field rotating element 800, the electromagnetic waves' maxima (red dots) moves clockwise, due to a rotational motion to the entire field pattern.

An example of an EM field pattern rotation in the presence of a field rotating element is also illustrated in FIGS. 12A-12C and 13A-13C. FIGS. 12A-12C show change in EM field over time inside a rectangular energy application zone, for example, the rectangular waveguide illustrated in FIG. 7A. FIGS. 13A-13C illustrate change in electromagnetic field over time inside a circular energy application zone, for example, the circular waveguide illustrated in FIG. 7B.

In FIG. 7A (and in the corresponding simulations represented in FIGS. 12A-12C), two point sources supply electromagnetic energy to the rectangular energy application zone (e.g., resonant cavity) and excite the energy application zone's resonator. In FIG. 7B (and in the corresponding simulations, the results of which are represented in FIGS. 13A-13C), one point source is used to supply EM energy. Both energy application zones in FIGS. 7A and 7B contain ferrite element 1030. FIG. 12A shows an EM field pattern in the rectangular waveguide where two field maxima stand left and right along a line 1210 at ωt=0 degrees. FIG. 7B shows the EM field pattern obtained at later time, i.e. at ωt=90 degrees, wherein maxima are found along the line (1220). At ωt=180 degrees, the electromagnetic field pattern further rotates from the position of ωt=90 degrees to that it had at ωt=180 degrees. The rotation of the EM field pattern is a result of the interaction between the electromagnetic waves and ferrite element 1030.

Another example for rotation of field pattern in the presence of a field rotating element is illustrated in FIGS. 13A-13C. FIGS. 13A-13C show the electromagnetic field distribution obtained in the circular energy application zone at different time-phase values. From ωt=0 degree to ωt=90 degrees, two field maxima rotate about 90 degrees. Then from ωt=90 degrees to ωt=180 degrees, the two maxima further rotate about 90 degrees.

A desired field pattern modification (or mode stirring or rotation) in the resonator structure can be achieved, at least in part, by the choice of design of the field rotating element parameters (e.g., shape, the value of the bias and modulation of the magnetic field used to impart anisotropy to the field rotating element). To obtain a desired mode rotation in a rectangular resonator, for example, the location of the field rotating element inside the cavity may be experimentally or computationally determined (e.g., in conjunction with computerized simulations) such that it would properly affect the EM field pattern in the energy application zone. Generally, more uniform distribution of the electric field energy may be achieved if the field rotating element is placed between two maxima of an electric field pattern obtained without the field rotating element. Accordingly, it may be useful to design a cavity having a plurality of field rotating element placed in various locations and to choose which of the field rotating element to activate (e.g., by use of a electromagnet) in order to match the EM field pattern developed within the cavity.

In the case of a circular resonator, the relative positions of the field rotating element and the radiating element may affect the performance of the field rotating element. By experimentally altering the locations of the field rotating element inside the resonator, improved uniformity of the electric field distribution in the energy application zone may be achieved.

FIGS. 12A-12C and FIGS. 13A-13C show that the electric field maxima rotate with changes in time-phase (e.g., the electric field maxima rotates in time). In this case, the time-average of the electric field energy may be more uniform along any given radius around the axis of rotation and so the absorption of EM energy by the object may be more uniform along such radiuses.

Figure 14:
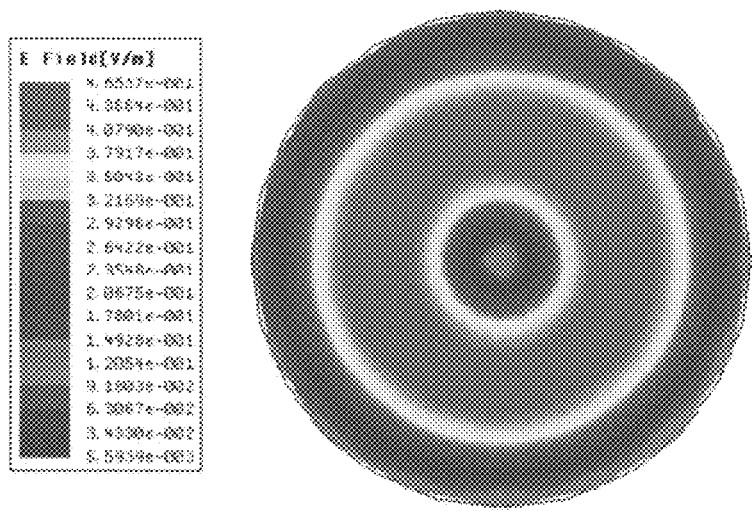
FIG. 14 is a graphical representation of simulation results of time average of an EM field pattern obtained in a circular resonance cavity in accordance with some exemplary embodiments of the present invention.

FIGS. 13A-13C show field distributions obtained in some specific points in time-phase. FIG. 14 shows the time average of field distributions obtained within a single rotation of the EM field pattern. Evidently, in FIG. 14, the electromagnetic field pattern is more uniform at any given radius, than an EM field pattern that may be obtained without the field rotating element at the same radius.

The rotation of the EM field pattern may be used to obtain improved time-average uniformity of electric field intensity distribution within resonant EM systems, which may be used for example, for EM heating purposes.

According to some embodiments of the invention, the at least one field rotating element may be configured such that when the radiating element supplies EM waves into the zone, an EM field pattern resulting from the EM waves having a plurality of EM modes may rotate. For example, by increasing the number of modes in the cavity (for example, by transmitting a plurality of MSE's or by a different resonator excitation and matching procedure), fully uniform distribution of the EM energy in the resonance structure and the object may be achieved. The rotation rate of the modes may be dependent on the EM field frequency, for example.

In accordance with some embodiments of the invention, a field rotating element, as described earlier, may be used in with an apparatus for delivering EM energy to an object that uses a single MSE (e.g., an oven that works at a single frequency) or a plurality of MSEs (e.g., a plurality of frequencies). Depending on the specific configuration, the use of the field rotating element may increase the uniformity of energy dissipation in an object in the energy application zone as compared to a similar system (e.g., oven) without the field rotating element. Alternatively or additionally, in the case of a multi MSE system (e.g., a system that transfers EM energy at a plurality of MSEs—for example at a plurality of frequencies), the use of a field rotating element may reduce the number of MSEs needed in order to achieve uniform or substantially uniform dissipation of energy into the object as compared to a similar system without a field rotating element.

Examples of the invention are described herein in connection with heating performed in cavity 1000. Persons of ordinary skill in the art will appreciate that core, inventive principles of energy application discussed herein may be applied across various field, forms of energy application zones, and for a variety of purposes other than for including heating. In many respects, it is these broader principles that are the subject of the appended claims.

Moreover, it will be apparent to those skilled in the art from consideration of the specification and practice of the present disclosure that various modifications and variations can be made to the disclosed systems and methods without departing from the scope of the invention, as claimed. Thus, it is intended that the specification and examples be considered as exemplary only, with a true scope of the present disclosure being indicated by the following claims and their equivalents.

What is claimed is:

1. An apparatus for exciting a rotating field pattern in a cavity containing an object, the apparatus comprising:
   a radiating element configured to excite an electromagnetic (EM) field pattern in the cavity, wherein the EM field pattern is excited with EM energy at a frequency in the radio-frequency (RF) range;
   a field rotating element positioned within the cavity and configured to rotate the EM field pattern within the cavity, wherein the field rotating element has an anisotropy, the anisotropy selected from magnetic anisotropy, electric anisotropy, and a combination of magnetic and electric anisotropies; and
   a controller configured to determine the EM field pattern according to value indicative of energy absorbable by the object and to control the anisotropy of the field rotating element in order to rotate the EM field pattern.

2. The apparatus of claim 1, wherein the field rotating element comprises magnetizable material and the apparatus further comprises a magnetic source configured to cause magnetic anisotropy in the magnetizable material.

3. The apparatus of claim 2, wherein the controller is further configured to change the magnetic anisotropy in the field rotating element by controlling the magnetic source.

4. The apparatus of claim 1, comprising at least two radiating elements configured to excite at least one EM field pattern in the cavity.

5. The apparatus of claim 4, wherein the controller is further configured to control a phase difference between EM waves excited by at least two of the radiating elements.

6. An apparatus for applying electromagnetic energy to a cavity for heating an object within the cavity, the apparatus comprising:
   at least one radiating element configured to deliver electromagnetic energy to the cavity;
   at least one controller configured to determine at least one modulation space element (MSE) that excites at least one field pattern in the cavity; and
   at least one field rotating element positioned within the cavity and configured to rotate the at least one field pattern within the cavity when the radiating element applies electromagnetic energy at the determined MSE into the cavity.

7. The apparatus of claim 6, wherein the field rotating element has an anisotropy, selected from magnetic anisotropy, electric anisotropy and a combination of magnetic and electric anisotropies.

8. The apparatus of claim 6, wherein the field rotating element comprises magnetizable material and the apparatus comprises a magnetic source for causing magnetic anisotropy in the magnetizable material.

9. The apparatus of claim 7, wherein the controller is further configured to change the anisotropy in the field rotating element by controlling a magnetic source.

10. The apparatus of claim 8, wherein the controller is configured to control the magnetic source in accordance with the determined MSE.

11. The apparatus of claim 8, wherein the controller is further configured to control one or more of direction, strength, duration, and timing of a magnetic field applied by the magnetic source.

12. The apparatus of claim 6, wherein the energy application zone includes a resonator cavity.

13. The apparatus of claim 6, wherein the field rotating element comprises Ferrite.

14. The apparatus of claim 6, further comprising at least two radiating elements configured to deliver EM energy to the energy application zone and the at least one controller configured to control a phase difference between the at least two radiating elements.

15. A method for applying electromagnetic energy into within a cavity, the method comprising:

determining at least one modulation space element (MSE) that excites at least one field pattern in the cavity;

delivering electromagnetic energy to the cavity at the at least one MSE; and rotating the EM field pattern within the cavity by causing anisotropy in the field rotating element, wherein the field rotating element is located within the cavity.

16. The method of claim 15, wherein the causing anisotropy is at the at least one MSE.

17. The method of claim 15, wherein the at least one field rotating element comprises magnetizable material and the causing anisotropy comprises magnetizing the magnetizable material.

18. The method of claim 17, further including altering the magnetization of the magnetizable material.

19. The method of claim 17, wherein magnetizing the magnetizable material comprises forming a magnetic field at the MSE.

20. The method of claim 17, wherein magnetizing the magnetizable material comprises controlling one or more of the direction, strength, duration, or timing of a magnetic field.

* * * * *